United States Patent
Lee et al.

(10) Patent No.: US 7,647,959 B2
(45) Date of Patent: Jan. 19, 2010

(54) LCD BONDING MACHINE AND METHOD FOR FABRICATING LCD BY USING THE SAME

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 582 days.

(21) Appl. No.: 11/305,019

(22) Filed: Dec. 19, 2005

(65) Prior Publication Data

US 2006/0096709 A1 May 11, 2006

Related U.S. Application Data

(62) Division of application No. 10/184,076, filed on Jun. 28, 2002, now Pat. No. 6,991,699.

(30) Foreign Application Priority Data

| Feb. 5, 2002 | (KR) | ............................. 10-2002-6564 |
| Mar. 14, 2002 | (KR) | ........................... 10-2002-13884 |
| Mar. 22, 2002 | (KR) | ........................... 10-2002-15644 |
| May 23, 2002 | (KR) | ........................... 10-2002-28700 |

(51) Int. Cl.
*B29C 65/00* (2006.01)

(52) U.S. Cl. ...................... 156/382; 156/580

(58) Field of Classification Search ............... 156/285, 156/286, 382, 580
See application file for complete search history.

(56) References Cited

U.S. PATENT DOCUMENTS

| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |

(Continued)

FOREIGN PATENT DOCUMENTS

| CN | 1261460 A | 7/2000 |
| EP | 1 003 066 A1 | 5/2000 |
| EP | 1003066 A1 | 5/2000 |

(Continued)

OTHER PUBLICATIONS

Machine translation of JP 10-142616 Oct. 2008.*
WO 01/16396 Mar. 2001 Shinriki et al.*
WO 98/49720 Nov. 1998 Kasai.*

(Continued)

*Primary Examiner*—John L Goff
(74) *Attorney, Agent, or Firm*—McKenna Long & Aldridge LLP

(57) ABSTRACT

A bonding machine for fabricating an liquid crystal display (LCD) panel to which a liquid crystal dropping method been performed includes a bonding chamber of a one pieced body for carrying out bonding of substrates, at least two or more than two air extraction tubes in communication with an interior space of the bonding chamber, and at least two vacuum means respectively connected to the air extraction tubes each for generating an air suction power to evacuate the bonding chamber. A method for fabricating an LCD panel by using the bonding machine includes loading a first substrate onto which liquid crystal has been dropped and a second substrate having sealant coated thereon into a bonding chamber, evacuating the bonding chamber, bonding the first and second substrates, applying varying bonding pressure, and unloading the bonded first and second substrates.

7 Claims, 28 Drawing Sheets

U.S. PATENT DOCUMENTS

| | | | |
|---|---|---|---|
| 4,775,225 A | 10/1988 | Tsuboyama et al. | |
| 5,088,697 A * | 2/1992 | Murakami et al. | 266/250 |
| 5,247,377 A | 9/1993 | Omeis et al. | |
| 5,263,888 A | 11/1993 | Ishihara et al. | 445/25 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,557,215 A * | 9/1996 | Saeki et al. | 324/765 |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,254,449 B1 | 7/2001 | Nakanishi et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,537,707 B1 | 3/2003 | Lee | |
| 6,646,689 B2 | 11/2003 | Matsuda | 349/1 |
| 6,817,377 B1 * | 11/2004 | Reimer et al. | 137/565.23 |
| 2001/0021000 A1 | 9/2001 | Egami | |
| 2002/0008838 A1* | 1/2002 | Matsuda | 349/187 |
| 2002/0134753 A1* | 9/2002 | Kasai | 216/37 |
| 2003/0147039 A1 | 8/2003 | Lee et al. | 349/187 |

FOREIGN PATENT DOCUMENTS

| | | |
|---|---|---|
| JP | 51-065656 | 6/1976 |
| JP | 51-65656 | 6/1976 |
| JP | 52-071272 | 5/1977 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | 1-141379 | 9/1989 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 5-172093 | 7/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073096 | 3/1997 |

| | | | | | |
|---|---|---|---|---|---|
| JP | 09073075 | 3/1997 | JP | 2001-133745 | 5/2001 |
| JP | 09073096 | 3/1997 | JP | 2001-133794 | 5/2001 |
| JP | H09-094500 | 4/1997 | JP | 2001-133799 | 5/2001 |
| JP | 09-127528 | 5/1997 | JP | 2001-142074 | 5/2001 |
| JP | 09127528 | 5/1997 | JP | 2001-147437 | 5/2001 |
| JP | 09-230357 | 9/1997 | JP | 2001133794 | 5/2001 |
| JP | 09230357 | 9/1997 | JP | 2001142074 | 5/2001 |
| JP | 09-281511 | 10/1997 | JP | 2001147437 | 5/2001 |
| JP | 09281511 | 10/1997 | JP | 2001-154211 | 6/2001 |
| JP | 09311340 | 12/1997 | JP | 2001-166272 | 6/2001 |
| JP | 10-123537 | 5/1998 | JP | 2001-166310 | 6/2001 |
| JP | 10-123538 | 5/1998 | JP | 2001154211 | 6/2001 |
| JP | 10-142616 | 5/1998 | JP | 2001-183683 | 7/2001 |
| JP | 10123537 | 5/1998 | JP | 2001-201750 | 7/2001 |
| JP | 10123538 | 5/1998 | JP | 2001-209052 | 8/2001 |
| JP | 10142616 | 5/1998 | JP | 2001-209056 | 8/2001 |
| JP | 10-177178 | 6/1998 | JP | 2001-209057 | 8/2001 |
| JP | H10-174924 | 6/1998 | JP | 2001-209058 | 8/2001 |
| JP | 10-221700 | 8/1998 | JP | 2001-209060 | 8/2001 |
| JP | 10221700 | 8/1998 | JP | 2001-215459 | 8/2001 |
| JP | 10-282512 | 10/1998 | JP | 2001-222017 | 8/2001 |
| JP | 10282512 | 10/1998 | JP | 2001-235758 | 8/2001 |
| JP | 10-333157 | 12/1998 | JP | 2001-215459 | 9/2001 |
| JP | 10-333159 | 12/1998 | JP | 2001-255542 | 9/2001 |
| JP | 11-014953 | 1/1999 | JP | 2001-264782 | 9/2001 |
| JP | 11014953 | 1/1999 | JP | 2001255542 | 9/2001 |
| JP | 11-038424 | 2/1999 | JP | 2001264782 | 9/2001 |
| JP | 11038424 | 2/1999 | JP | 2001-201750 | 10/2001 |
| JP | 11-064811 | 3/1999 | JP | 2001-272640 | 10/2001 |
| JP | 11064811 | 3/1999 | JP | 2001-281675 | 10/2001 |
| JP | 11-109388 | 4/1999 | JP | 2001-281678 | 10/2001 |
| JP | 11109388 | 4/1999 | JP | 2001-282126 | 10/2001 |
| JP | 11-133438 | 5/1999 | JP | 2001-300757 | 10/2001 |
| JP | 11-142864 | 5/1999 | JP | 2001-305563 | 10/2001 |
| JP | 11-174477 | 7/1999 | JP | 2001-330837 | 11/2001 |
| JP | 11174477 | 7/1999 | JP | 2001-330840 | 11/2001 |
| JP | 11-212045 | 8/1999 | JP | 2001330840 | 11/2001 |
| JP | 11212045 | 8/1999 | JP | 2001-343657 | 12/2001 |
| JP | 11-248930 | 9/1999 | JP | 2001-356353 | 12/2001 |
| JP | H11-262712 | 9/1999 | JP | 2001-356354 | 12/2001 |
| JP | H11-264991 | 9/1999 | JP | 2001356354 | 12/2001 |
| JP | 11-326922 | 11/1999 | JP | 2002-014360 | 1/2002 |
| JP | 11-344714 | 12/1999 | JP | 2002-023176 | 1/2002 |
| JP | 11344714 | 12/1999 | JP | 2002014360 | 1/2002 |
| JP | 2000-002879 | 1/2000 | JP | 2002023176 | 1/2002 |
| JP | 2000-029035 | 1/2000 | JP | 2002-049045 | 2/2002 |
| JP | 2000029035 | 1/2000 | JP | 2002-053954 | 2/2002 |
| JP | 2000-056311 | 2/2000 | JP | 2002049045 | 2/2002 |
| JP | 2000-066165 | 3/2000 | JP | 2002-079160 | 3/2002 |
| JP | 2000-066218 | 3/2000 | JP | 2002-080321 | 3/2002 |
| JP | 2000-093866 | 4/2000 | JP | 2002-082340 | 3/2002 |
| JP | 2000-137235 | 5/2000 | JP | 2002-090759 | 3/2002 |
| JP | 2000-147528 | 5/2000 | JP | 2002-090760 | 3/2002 |
| JP | 3000-147528 | 5/2000 | JP | 2002082340 | 3/2002 |
| JP | 2000-161215 | 6/2000 | JP | 2002090759 | 3/2002 |
| JP | 2000-193988 | 7/2000 | JP | 2002090760 | 3/2002 |
| JP | 2000-241824 | 9/2000 | JP | 2002-107740 | 4/2002 |
| JP | 2000-284295 | 10/2000 | JP | 2002-122870 | 4/2002 |
| JP | 2000-292799 | 10/2000 | JP | 2002-122872 | 4/2002 |
| JP | 2000-310759 | 11/2000 | JP | 2002-122873 | 4/2002 |
| JP | 2000-310784 | 11/2000 | JP | 2002107740 | 4/2002 |
| JP | 2000-338501 | 12/2000 | JP | 2002122872 | 4/2002 |
| JP | 2001-005401 | 1/2001 | JP | 2002122873 | 4/2002 |
| JP | 2001-005405 | 1/2001 | JP | 2002-131762 | 5/2002 |
| JP | 2001-013506 | 1/2001 | JP | 2002-139734 | 5/2002 |
| JP | 2001-033793 | 2/2001 | JP | 2002-156518 | 5/2002 |
| JP | 2001-042341 | 2/2001 | JP | 2002-169166 | 6/2002 |
| JP | 2001-051284 | 2/2001 | JP | 2002-169167 | 6/2002 |
| JP | 2001-066615 | 3/2001 | JP | 2002-182222 | 6/2002 |
| JP | 2001-091727 | 4/2001 | JP | 2002080321 | 6/2002 |
| JP | 2001-117105 | 4/2001 | JP | 2002-202512 | 7/2002 |
| JP | 2001-117109 | 4/2001 | JP | 2002-202514 | 7/2002 |
| JP | 2001117105 | 4/2001 | JP | 2002-214626 | 7/2002 |

| | | |
|---|---|---|
| JP | 2002202512 | 7/2002 |
| JP | 2002202514 | 7/2002 |
| JP | 2002214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| KR | 2000-0035302 | 6/2000 |
| KR | 1020020015004 A | 2/2002 |
| KR | 2002-76691 A | 10/2002 |

OTHER PUBLICATIONS

U.S. Appl. No. 10/128,440, filed Apr. 24, 2002.
U.S. Appl. No. 10/184,077, filed Jun. 28, 2002.
U.S. Appl. No. 10/184,087, filed Jun. 28, 2002.
U.S. Appl. No. 10/184,118, filed Jun. 28, 2002.
U.S. Appl. No. 10/244,668, filed Sep. 17, 2002.
U.S. Appl. No. 10/259,321, filed Sep. 30, 2002.
U.S. Appl. No. 10/259,698, filed Sep. 30, 2002.
U.S. Appl. No. 10/289,380, filed Nov. 7, 2002.
U.S. Appl. No. 10/308,130, filed Dec. 3, 2002.
U.S. Appl. No. 10/308,156, filed Dec. 3, 2002.
U.S. Appl. No. 10/316,897, filed Dec. 12, 2002.
U.S. Appl. No. 10/625,525, filed Jul. 24, 2003.
U.S. Appl. No. 10/661,472, filed Sep. 15, 2003.
U.S. Appl. No. 10/661,473, filed Sep. 15, 2003.
U.S. Appl. No. 10/661,515, filed Sep. 15, 2003.
U.S. Appl. No. 10/701,489, filed Nov. 6, 2003.
U.S. Appl. No. 10/735,730, filed Dec. 16, 2003.
U.S. Appl. No. 10/874,169, filed Jun. 24, 2005.
U.S. Appl. No. 10/874,220, filed Jun. 24, 2005.
U.S. Appl. No. 10/895,934, filed Jul. 22, 2004.
U.S. Appl. No. 11/043,042, filed Jan. 27, 2005.
U.S. Appl. No. 11/117,316, filed Apr. 29, 2005.
U.S. Appl. No. 10/125,520, filed Apr. 19, 2002.
U.S. Appl. No. 10/128,561, filed Apr. 23, 2002.
U.S. Appl. No. 10/132,191, filed Apr. 26, 2002.
U.S. Appl. No. 10/156,191, filed May 29, 2005.
U.S. Appl. No. 10/184,075, filed Jun. 28, 2002.
U.S. Appl. No. 10/184,076, filed Jun. 28, 2002.
U.S. Appl. No. 10/184,082, filed Jun. 28, 2002.
U.S. Appl. No. 10/184,083, filed Jun. 28, 2002.
U.S. Appl. No. 10/184,088, filed Jun. 28, 2002.
U.S. Appl. No. 10/184,096, filed Jun. 28, 2002.
U.S. Appl. No. 10/184,115, filed Jun. 28, 2002.
U.S. Appl. No. 10/184,117, filed Jun. 28, 2002.
U.S. Appl. No. 10/184,119, filed Jun. 28, 2002.
U.S. Appl. No. 10/244,734, filed Sep. 17, 2002.
U.S. Appl. No. 10/245,498, filed Sep. 18, 2002.
U.S. Appl. No. 10/255,991, filed Sep. 27, 2002.
U.S. Appl. No. 10/259,416, filed Sep. 30, 2002.
U.S. Appl. No. 10/259,517, filed Sep. 30, 2002.
U.S. Appl. No. 10/259,640, filed Sep. 30, 2002.
U.S. Appl. No. 10/260,570, filed Oct. 1, 2002.
U.S. Appl. No. 10/301,597, filed Nov. 22, 2002.
U.S. Appl. No. 10/302,869, filed Nov. 25, 2002.
U.S. Appl. No. 10/308,138, filed Dec. 3, 2002.
U.S. Appl. No. 10/318,159, filed Dec. 13, 2002.
U.S. Appl. No. 10/322,422, filed Dec. 19, 2002.
U.S. Appl. No. 10/322,553, filed Dec. 19, 2002.
U.S. Appl. No. 10/323,882, filed Dec. 20, 2002.
U.S. Appl. No. 10/326,374, filed Dec. 23, 2002.
U.S. Appl. No. 10/329,413, filed Dec. 27, 2002.
U.S. Appl. No. 10/329,429, filed Dec. 27, 2002.
U.S. Appl. No. 10/330,132, filed Dec. 30, 2002.
U.S. Appl. No. 10/330,434, filed Dec. 30, 2002.
U.S. Appl. No. 10/331,771, filed Dec. 31, 2002.
U.S. Appl. No. 10/392,871, filed Mar. 21, 2003.
U.S. Appl. No. 10/455,718, filed Jun. 6, 2003.
U.S. Appl. No. 10/607,046, filed Jun. 27, 2003.
U.S. Appl. No. 10/608,371, filed Jun. 30, 2003.
U.S. Appl. No. 10/659,587, filed Sep. 11, 2003.
U.S. Appl. No. 10/660,655, filed Sep. 12, 2003.
U.S. Appl. No. 10/671,454, filed Sep. 29, 2003.
U.S. Appl. No. 10/691,656, filed Oct. 24, 2003.
U.S. Appl. No. 10/691,662, filed Oct. 24, 2003.
U.S. Appl. No. 10/698,471, filed Nov. 3, 2003.
U.S. Appl. No. 10/699,845, filed Nov. 4, 2003.
U.S. Appl. No. 10/699,854, filed Nov. 4, 2003.
U.S. Appl. No. 10/712,936, filed Nov. 14, 2003.
U.S. Appl. No. 10/717,542, filed Nov. 21, 2003.
U.S. Appl. No. 10/717,717, filed Nov. 21, 2003.
U.S. Appl. No. 10/726,584, filed Dec. 4, 2003.
U.S. Appl. No. 10/727,570, filed Dec. 5, 2003.
U.S. Appl. No. 10/779,842, filed Feb. 18, 2004.
U.S. Appl. No. 10/824,436, filed Apr. 15, 2004.
U.S. Appl. No. 10/824,585, filed Apr. 15, 2005.
U.S. Appl. No. 10/825,205, filed Apr. 16, 2005.
U.S. Appl. No. 10/825,206, filed Apr. 16, 2004.
U.S. Appl. No. 10/825,244, filed Apr. 16, 2005.
U.S. Appl. No. 10/825,362, filed Apr. 16, 2004.
U.S. Appl. No. 10/832,312, filed Apr. 27, 2004.
U.S. Appl. No. 10/840,415, filed May 7, 2004.
U.S. Appl. No. 10/843,554, filed May 12, 2004.
U.S. Appl. No. 10/847,286, filed May 18, 2004.
U.S. Appl. No. 10/851,176, filed May 24, 2004.
U.S. Appl. No. 10/873,494, filed Jun. 23, 2004.
U.S. Appl. No. 10/874,534, filed Jun. 24, 2005.
U.S. Appl. No. 10/875,558, filed Jun. 25, 2004.
U.S. Appl. No. 10/875,578, filed Jun. 25, 2004.
U.S. Appl. No. 10/895,926, filed Jul. 22, 2004.
U.S. Appl. No. 10/896,953, filed Jul. 23, 2004.
U.S. Appl. No. 10/914,463, filed Aug. 10, 2004.
U.S. Appl. No. 10/917,342, filed Aug. 13, 2004.
U.S. Appl. No. 10/917,425, filed Aug. 13, 2004.
U.S. Appl. No. 10/917,486, filed Aug. 13, 2004.
U.S. Appl. No. 10/929,453, filed Aug. 31, 2004.
U.S. Appl. No. 10/950,678, filed Sep. 28, 2004.
U.S. Appl. No. 10/963,640, filed Oct. 14, 2004.
U.S. Appl. No. 10/965,900, filed Oct. 18, 2004.
U.S. Appl. No. 10/975,468, filed Oct. 29, 2004.
U.S. Appl. No. 10/979,147, filed Nov. 3, 2004.
U.S. Appl. No. 10/982,796, filed Nov. 8, 2004.
U.S. Appl. No. 10/988,557, filed Nov. 16, 2004.
U.S. Appl. No. 10/988,834, filed Nov. 16, 2004.
U.S. Appl. No. 10/995,543, filed Nov. 24, 2004.
U.S. Appl. No. 10/995,564, filed Nov. 24, 2004.
U.S. Appl. No. 10/998,563, filed Nov. 30, 2004.
U.S. Appl. No. 11/002,888, filed Dec. 3, 2004.
U.S. Appl. No. 11/003,396, filed Dec. 6, 2004.
U.S. Appl. No. 11/003,469, filed Dec. 6, 2004.
U.S. Appl. No. 11/003,705, filed Dec. 6, 2004.
U.S. Appl. No. 11/004,076, filed Dec. 6, 2004.
U.S. Appl. No. 11/004,095, filed Dec. 6, 2004.
U.S. Appl. No. 11/004,925, filed Dec. 7, 2004.

U.S. Appl. No. 11/007,272, filed Dec. 9, 2004.
U.S. Appl. No. 11/008,140, filed Dec. 10, 2004.
U.S. Appl. No. 11/008,160, filed Dec. 10, 2004.
U.S. Appl. No. 11/008,272, filed Dec. 10, 2004.
U.S. Appl. No. 11/014,237, filed Dec. 17, 2004.
U.S. Appl. No. 11/014,238, filed Dec. 17, 2004.
U.S. Appl. No. 11/015,031, filed Dec. 20, 2004.
U.S. Appl. No. 11/016,891, filed Dec. 21, 2004.
U.S. Appl. No. 11/023,551, filed Dec. 29, 2004.
U.S. Appl. No. 11/048,856, filed Feb. 3, 2005.
U.S. Appl. No. 11/057,148, filed Feb. 15, 2005.
U.S. Appl. No. 11/113,268, filed Apr. 25, 2005.

* cited by examiner

LCD BONDING MACHINE AND METHOD FOR FABRICATING LCD BY USING THE SAME

This application is a Divisional of application Ser. No. 10/184,076 filed Jun. 28, 2002, now U.S. Pat. No. 6,991,699, which is hereby incorporated by reference as if fully set forth herein. The present invention claims the benefit of the Korean Application Nos. P2002-6564 filed on Feb. 5, 2002, P2002-13884 filed on Mar. 14, 2002, P2002-15644, filed on Mar. 22, 2002, and P2002-28700, filed on May 23, 2002, which are hereby incorporated by reference in their entirety as if fully set forth herein.

This application incorporates by reference two applications, Ser. No. 10/184,096, filed on Jun. 28, 2002, entitled "SYSTEM AND METHOD FOR MANUFACTURING LIQUID CRYSTAL DISPLAY DEVICES" now U.S. Pat. No. 7,295,279 and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" now U.S. Pat. No. 7,102,726, as if fully set forth herein.

BACKGROUND OF THE INVENTION

1. Field of the Invention

The present invention relates to a liquid crystal display (LCD), and more particularly, to an LCD bonding apparatus and method for fabricating an LCD incorporating a liquid crystal dispensing method applied thereto.

2. Discussion of the Related Art

In general, recent developments in the information communication field have increased demand for various types of display devices. In response to this demand, various flat panel displays such as liquid crystal display (LCD), plasma display panel (PDP), electro luminescent display (ELD), and vacuum fluorescent display (VFD) have been developed, some of which have been employed as displays in various products.

The LCDs have been used most widely as mobile displays. The LCD has replaced the CRT (Cathode Ray Tube) because of features and advantages including excellent picture quality, light weight, thin profile, and low power consumption. In addition to the mobile type LCDs, such as a display for notebook computer, LCDs have been developed for computer monitors and televisions to receive and display broadcasting signals.

Despite various technical developments in the LCD technology with applications in different fields, research in enhancing the picture quality of the LCD as a display has been in some respects lacking as compared to the features and advantages of the LCD. Therefore, to use the LCD in various fields as a general display, the key to developing the LCD lies on whether the LCD can provide a high quality picture, such as high resolution, high luminance, and large sized screen, while still maintaining light weight, thin profile, and low power consumption.

An LCD device includes a liquid crystal panel for displaying a picture and a driving part for providing a driving signal to the liquid crystal panel. The liquid crystal panel has first and second glass substrates bonded together with a gap between the substrates. A liquid crystal layer is formed by injecting liquid crystal into the gap between the first and second glass substrates.

On the first glass substrate (a TFT array substrate, for example), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines in a matrix, and a plurality of thin film transistors switchable in response to a signal from the gate lines for transmission of a signal from the data line to the pixel electrodes.

The second glass substrate (a color filter substrate) has a black matrix layer for shielding light from areas excluding the pixel regions, red (R), green (G), blue (B) color filter layers, and a common electrode for implementing a picture.

The foregoing first and second substrates have a gap between them which is maintained by spacers. The first and second substrates are bonded to each other by a sealant. The seal has a liquid crystal injection inlet through which liquid crystal is injected after the two substrates are bonded and sealed.

After the individual liquid crystal panels are cut, the space between the two bonded substrates of each LCD panel is evacuated and the liquid crystal injection inlet is dipped in a liquid crystal bath, so that the liquid crystal is injected into the space by a capillary tube phenomenon. Once the liquid crystal is injected into the space between the two substrates the liquid crystal injection inlet is sealed by a sealant.

However, the related art method for fabricating an LCD having liquid crystal injected therein has the following problems. First, the related art method has poor productivity because the dipping of the liquid crystal in a liquid crystal bath while the space between the two substrates are maintained at a vacuum and the unit panels are cut into individual pieces for injection of the liquid crystal takes much time. Second, the liquid crystal injection, for a large LCD in particular, may cause imperfect filling of the liquid crystal in the panel, which may result in a defective panel. Third, the complicated and lengthy fabrication process requires the use of many liquid crystal injection devices, which occupies a large portion of space.

Accordingly, a method for fabricating an LCD by using a liquid crystal dropping method has been under research recently. Japanese Patent Application Nos. H11-89612, and H11-172903, and Japanese Laid-Open Patent Publication No. 2000-147528 disclose the following liquid crystal dropping method.

FIGS. 1A-1D illustrate a related art bonding machine having the liquid crystal dropping method applied thereto. FIG. 2 illustrates a perspective view showing a state of operation of key parts of substrate receiving means in a related art bonding machine, schematically.

The related art LCD bonding machine (e.g., substrate assembler) is provided with a frame 10, stage parts 21 and 22, a sealant outlet (not shown), a liquid crystal dropping part 30, chamber parts 31 and 32, chamber moving means, substrate receiving means, stage moving means, and evacuating means.

The stage parts include an upper stage 21 and a lower stage 22. The sealant outlet and the liquid crystal dropping part 30 are fitted to the outside of the frame 10.

The chamber parts include an upper chamber unit 31 and a lower chamber unit 32. The upper chamber unit 31 has a vacuum valve 23 and a hose 24 connected thereto for evacuating the chamber parts, and a gas purge valve 80 and a gas tube 81 for turning the chamber parts from a vacuum state to an atmospheric pressure state.

The chamber moving means has a driving motor 40 for selective movement of the lower chamber unit 32. That is movement of the lower chamber unit 32 to a location (S2) where the bonding may occur or to a location (S1) where the coating of the sealant and dropping of the liquid crystal may occur.

The substrate receiving means for temporarily receiving opposite diagonal positions of the second substrate 52 and when the interior of the chamber is in vacuum and is attached and fixed to the upper stage 21.

The substrate receiving means has a rotatable shaft 61 passing from the outside chamber unit 31 to the interior of chamber unit 31. A rotation actuator 63 fixed to the outside of an upper part of the chamber unit 31, one end of the rotating shaft 61, for selective rotation of the rotating shaft 61, an elevating actuator 64 fixed to an outside of an upper part of the chamber unit 31 for selective elevation of the rotating shaft 61, and a supporting plate 62 formed as one unit with the rotating shaft 61 at the other end thereof for selective supporting of corners of the substrate.

The stage moving means has a shaft 71, a housing 72, a linear guide 73, a motor 74, a ball screw 75, and a nut housing 76. That is, the upper stage 21 is supported on the shaft 71 and the shaft is fixed to the housing 72. The housing 72 is fitted to the frame 10 by the linear guide 73. The upper stage 21 is moved up/down by the motor 74 fixed to a bracket 77 on frame 10. In this instance, the ball screw 75 and the nut housing 76 transmit a driving power, and the nut housing 76 is connected to the housing 72 through a load gauge 78.

The steps of a method for fabricating an LCD by using the foregoing related art bonding machine will be explained following an order of the fabrication process in detail.

Referring to FIG. 1A, the second substrate 52 in a carrier is placed on the lower stage by a robot arm 90. Next, the second substrate 52 is moved toward the upper stage 21 by the driving motor 40 positioned in the chamber moving means.

Referring to FIG. 1B, the upper stage 21 biases the second substrate 52 by vacuum. Next, the lower chamber unit 32, having the lower stage 22, is moved to location (S1) for coating sealant and dropping liquid crystal by driving the driving motor 40.

Then, referring to FIG. 1C, the first substrate 51 is placed on the lower stage 22 by the robot arm 90 and connected to the lower stage 22 by vacuum.

Referring to FIG. 1D, after the sealant coating and the liquid crystal dropping have been applied to the first substrate 51 by the sealant outlet and the liquid crystal dropping part 30, the chamber moving means 40 moves the lower chamber unit 32 to location (S2).

Next, the chamber moving means 40 unites the chamber units 31 and 32, thereby, enclosing a space where the stages 21 and 22 are placed so that the space can be evacuated with the vacuum valve 23 and the hose 24.

Since the vacuum of the space becomes higher than the vacuum applied to the upper stage 21, which holds the second substrate 52. Temporary safekeeping of the second substrate 52 is required before the space is fully evacuated in order to prevent the second substrate 52 from falling and/or breaking.

The elevating actuator 64 is driven to move the rotating shaft 51 toward the under side of the upper stage. In addition, the rotating actuator 63 is driven to rotate the rotating shaft 61 for placing a supporting plate 62 on two corners of the second substrate 52 connected to the upper stage 21 via a vacuum.

The stage moving means moves the upper stage 21 down to a location close to a height of the supporting plate 62 in which the substrate receiving means is located and releases the vacuum that holds the second substrate 52, in order to place the second substrate 52 on the supporting plates 62 as shown in FIG. 2.

When the chamber is fully evacuated, the second substrate 52 is held to the upper stage 21 by static electricity applied thereto. Subsequently, the rotating actuator 63 and the elevating actuator 64 are driven, bringing the supporting plates 62 and the rotating shaft 61 to their original positions where the bonding will not be interfered with.

Under the vacuum state the motor 74 is driven to move down the upper stage 21 thereby pressing the substrates 51 and 52 together.

In this instance, a preset pressure is applied as required for bonding by controlling the motor 74 with reference to pressure signals. That is, feed back pressure signals are used to ensure appropriate application of pressures. The load gauge 78 serves as a load cell (pressure application sensor).

FIGS. 3A-3F schematically illustrate sections showing the steps of a related art method for fabricating an LCD having the liquid crystal dropping method disclosed in Japanese laid-open patent publication No. 2000-147528 applied thereto.

Referring to FIG. 3A, ultra violet (UV) sealant 1 is coated on a first glass substrate 3 having thin film transistor arrays formed thereon to a thickness of approximately 30 μm. The liquid crystal 2 is dropped on an inner side of the UV sealant 1 where there is a thin film transistor array. No liquid crystal injection inlet is provided in the sealant 1.

The first glass substrate 3 in a vacuum chamber is mounted on a table 4, which is movable in a horizontal direction. A first vacuum channel 5 holds the entire bottom surface of the glass substrate 3.

Referring to FIG. 3B, the entire bottom surface of the second glass substrate 6 having the color filter arrays formed thereon is held by vacuum channels of 7 and the vacuum chamber is closed and evacuated. The second table is moved down in a vertical direction until a gap between the first and second glass substrate 3 and 6 is 1 mm. Table 4 with the first glass substrate 3 is moved in a horizontal direction to pre-align the first and second glass substrates 3 and 6.

Referring to FIG. 3C, the second table is moved down until the second glass substrate 6 comes into contact with the liquid crystal 2 and/or the sealant 1.

Referring to FIG. 3D, table 4 with the first glass substrate 3 is moved in a horizontal direction to align the first and second glass substrates 3 and 6.

Referring to FIG. 3E, the second table is moved down in a vertical direction until the second glass substrate 6 comes into contact with the sealant 1. In addition, the second table is pressed down until a gap between the second glass substrate 6 and the first glass substrate 3 becomes approximately 5 μm.

Referring to FIG. 3F, the bonded first and second glass substrates, 3 and 6 respectively, are taken out of the vacuum chamber and a UV ray is applied to the sealant in order to harden the sealant 1, thereby completing the fabrication of the LCD.

The foregoing related art vacuum bonding machine and method for fabricating an LCD having the liquid crystal dropping method applied thereto has the following problems.

First, the use of only one vacuum means creates difficulty in adjusting the evacuation rate. In particular, it is desirable that the interior of the chamber is evacuated faster in order to reduce the fabrication time period. However, the use of a vacuum means that can form a high vacuum (e.g., generating a high air suction power) causes defective amount of liquid crystal on the substrate, thereby causing a defective product. That is, the volatility of the liquid crystal becomes greater as the vacuum becomes higher. For example, a rapid evacuation of the interior of the bonding chamber may cause more violent volatilization, thereby creating a defective liquid crystal amount on the substrate.

Second, the use of a vacuum pump that forms a low air suction power for solving the foregoing problem requires a large amount of time for evacuating the interior of the chamber.

Third, rapid introduction of air into the process chamber when the vacuum state is changed may lead the upper or lower stage to become stuck to one of the substrates. This affects the atmospheric state bonding of the substrates significantly and may cause defective bonding.

Fourth, defective sealing between the lower chamber unit and the upper chamber unit when the two pieces are united can occur as a result of the two-pieced chamber parts. In particular, difficulty arises in forming a tight seal and may create vacuum leaks, which can prevent the desired degree of bonding due to difficulty in obtaining a high vacuum in the interior of the chamber.

Fifth, the supporting of corner parts of the substrate by the substrate receiving means may cause bending or warping of the substrate when the substrate is large and/or may cause the substrate to break and fall down from the substrate receiving means.

Sixth, the sealant coating and liquid crystal dropping on the same substrate require a lengthy fabrication time period before the two substrates are bonded.

Seventh, as the sealant is coated and the liquid crystal is dropped on the first substrate, no progress is made for the second substrate. Thereby, resulting in an imbalance of fabrication processes between the first and second substrates creating an ineffective operation of the production line.

Eighth, the first substrate has the sealant and liquid crystal applied, therefore, it can not be subjected to cleaning by ultra-sonic cleaning (USC). Therefore, particles can not be removed as the USC is not applied, and this may cause defective contact of the sealant in the bonding process.

SUMMARY OF THE INVENTION

Accordingly, the present invention is directed to a liquid crystal display (LCD) bonding machine and a method for fabricating a liquid crystal display having liquid crystal applied thereto using the same that substantially obviates one or more of the problems due to limitations and disadvantages of the related art.

An advantage of the present invention is to provide an LCD bonding machine and a method for fabricating an LCD having the liquid crystal applied thereto using the same, which reduces a fabrication time of the LCD and increases the efficiency to improve productivity Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention as embodied and broadly described, the LCD bonding machines include a bonding chamber of a one pieced body for carrying out bonding of substrates, at least two or more than two air extraction tubes in communication with an interior space of the bonding chamber, and at least two vacuum means respectively connected to each air extraction tubes for generating an air suction power to evacuate the bonding chamber.

In one aspect of the present invention, at least one of the vacuum means includes a Turbo Molecular Pump (TMP) for generating a greater air suction power than the other vacuum means, for example a dry pump.

In the present aspect of the invention, the other vacuum means includes a plurality, e.g., four, dry pumps that may be paired into two sets, wherein each of the pairs may be connected to one of the air extraction tubes. Additionally, the TMP of present aspect of the invention has an evacuation rate of, for example, 0.1-5.0 kl/min and the dry pump has an evacuation rate of, for example, 10-30 kl/min.

In another aspect of the present invention, the bonding chamber includes a vent tube in communication with the bonding chamber for supplying air or gas and gas supply means connected in correspondence to vent tube of the bonding chamber for respectively supplying air or gas at different pressures.

The gas supplying means may include a gas charge part having gas, such as air or gas, stored therein for turning a pressure within the bonding chamber from a vacuum state into an atmospheric pressure state and a valve for selectively opening and shutting the vent tube. The gas supplying means may further include a driving pump for forced pumping of the air or gas stored in the gas charge part into the bonding chamber.

In yet another aspect of the present invention, a method for fabricating an LCD includes steps of loading a first substrate having liquid crystal applied thereon, and a second substrate having a sealant coated thereon, into a bonding chamber; evacuating the bonding chamber; bonding the first and second substrates using varied bonding pressures; and unloading the bonded first and second substrates.

In the present aspect of the invention, the loading step may include holding the second substrate to an upper stage provided within the bonding chamber, and holding the first substrate to a lower stage also provided within the bonding chamber, for example, using electrostatic charge (ESC).

In the present aspect of the invention, the step of evacuating the bonding chamber may include two stages. Accordingly, the step of evacuating the bonding chamber may include a first evacuation step carried out after the first and second substrates are arranged on the lower and upper stages, respectively, and a second evacuation step carried out after a substrate receiver is moved below the second substrate.

In the present aspect of the invention, the step of unloading the first and second substrates may be carried out when the bonding chamber pressure is below 50 Pa and may further include the steps of the holding the bonded first and second substrates using the upper stage, moving the upper stage upwards, and loading an unbonded first or second substrate and unloading the bonded substrates held to the upper stage.

The method for fabricating LCDs may further include the step of venting the bonding chamber to thereby apply pressure to the bonded substrates.

In one aspect of the present invention, the method for fabricating LCDs may further include a step of spreading liquid crystal, for example toward the seal, before or after the step of unloading the bonded first and second substrates. The step of liquid crystal spreading may be carried out for a period of time, for example, at least 10 minutes.

In further aspect of the present invention, a method for fabricating LCDs uses bonding machines having an upper stage and a lower stage, respectively, arranged in upper and lower spaces of the bonding chamber; a turbo molecular pump (TMP) and dry pumps, vent means, and substrate receiving means. The method includes the steps of loading a second substrate having sealant coated thereon and a first substrate having liquid crystal dispensed thereon; putting the dry pump into operation for a first evacuation of the bonding chamber; moving the substrate receiving means for supporting the second substrate; putting the TMP into operation for a second evacuation of the bonding chamber; moving the upper and lower stages for bonding the first and second substrates; and putting vent means into operation to vent the bonding chamber for application of a pressure to the bonded substrates. The step of putting vent means into operation for venting the bonding chamber and applying pressure to the bonded substrates may include two stages.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1A:
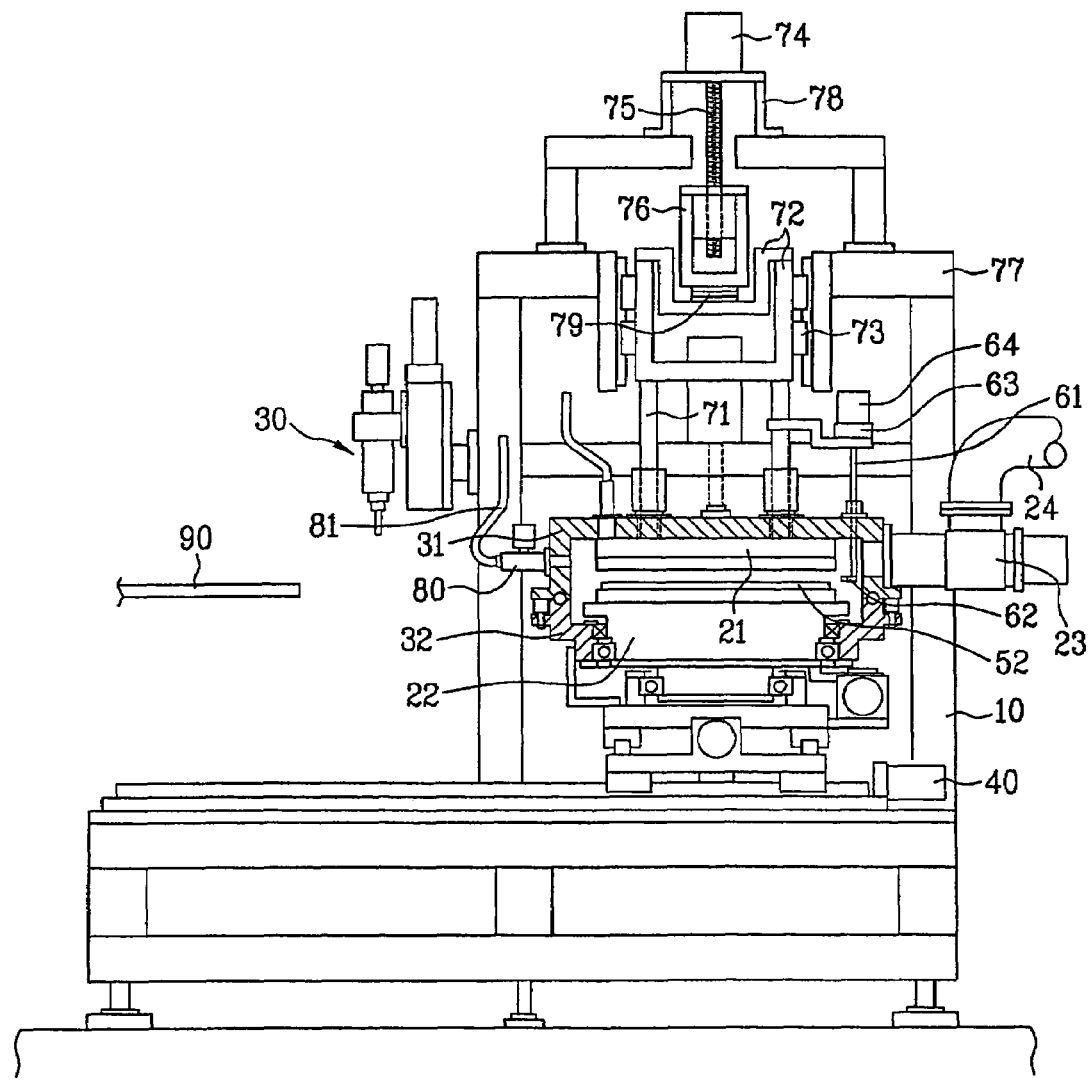
FIGS. 1A-1D illustrate the bonding steps using a related art LCD bonding machine.
Figure 1B:
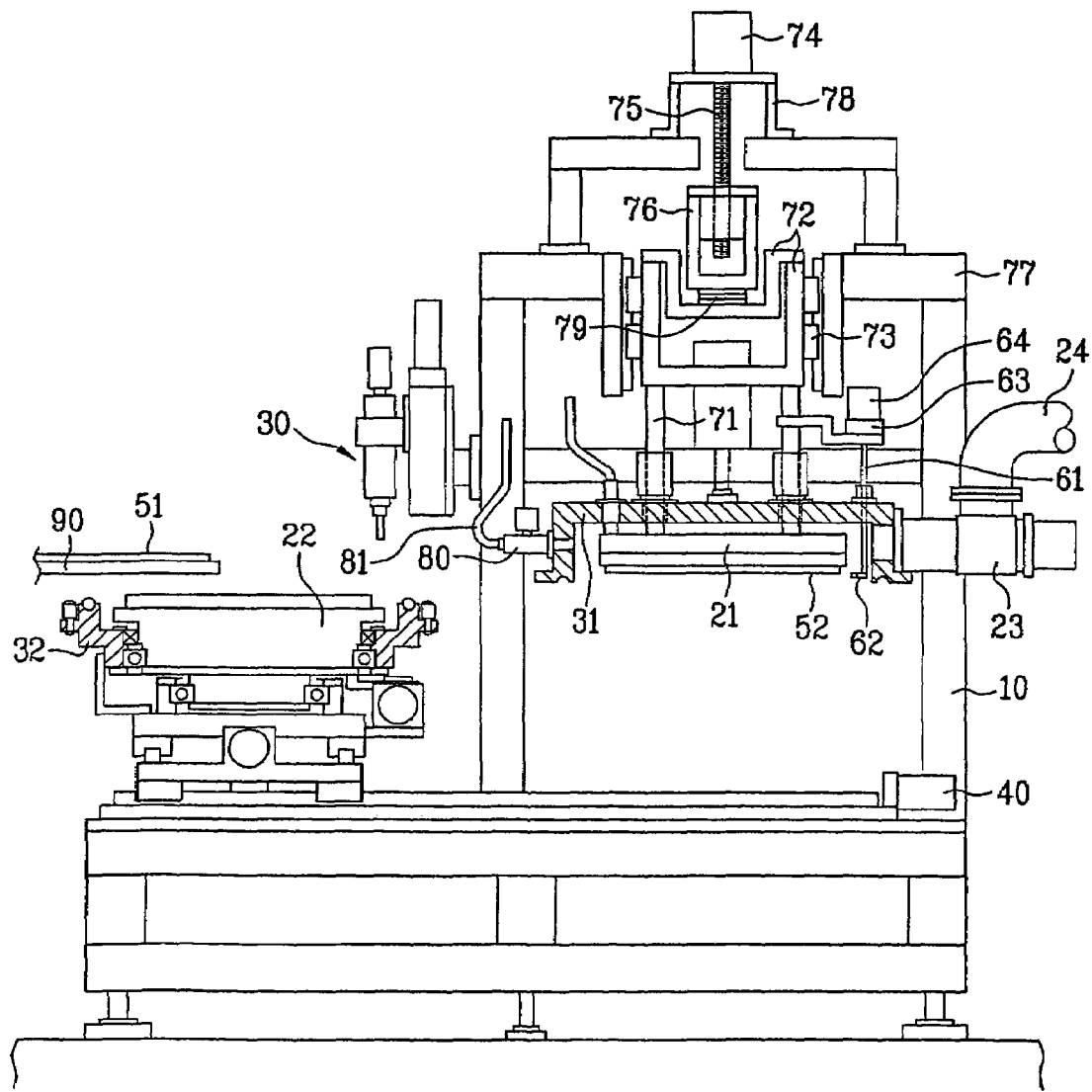
Figure 1C:
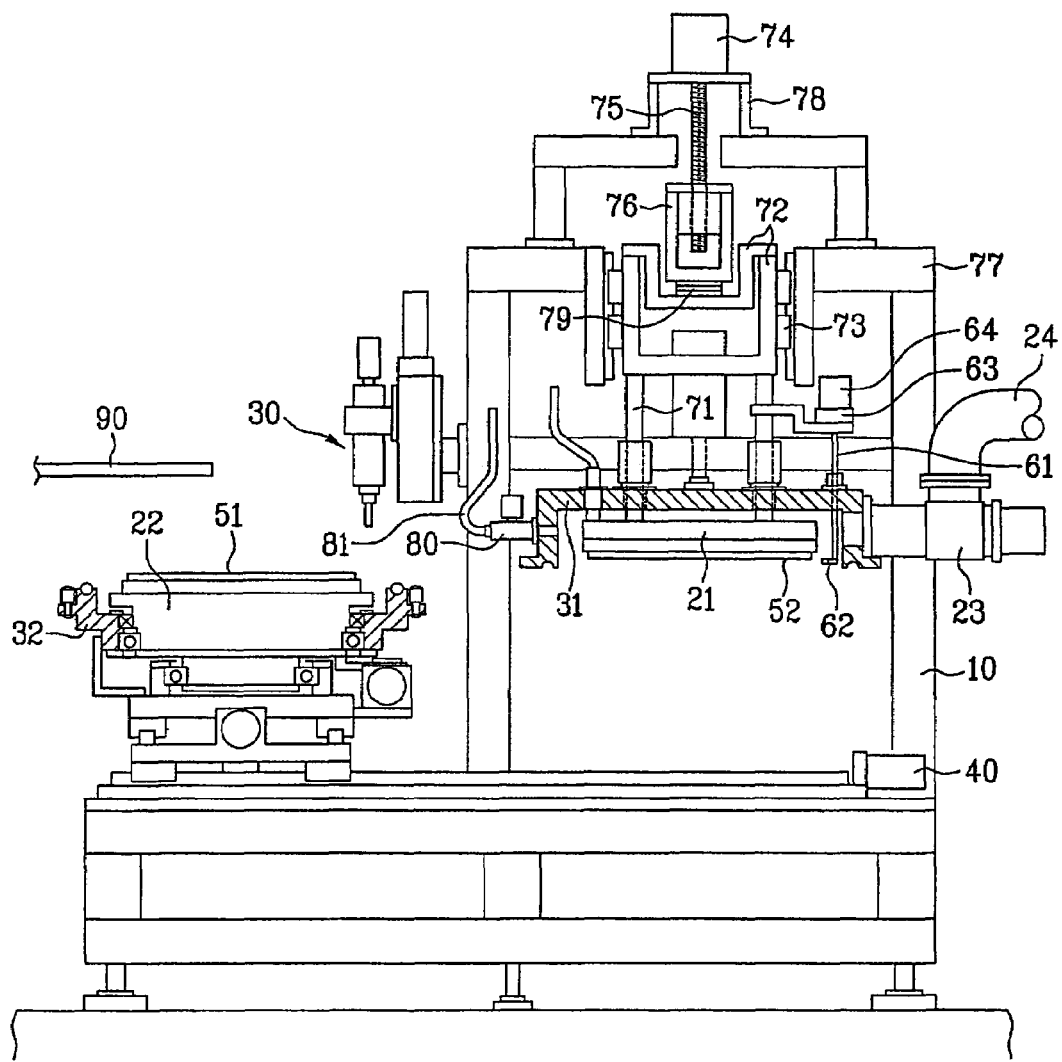
Figure 1D:
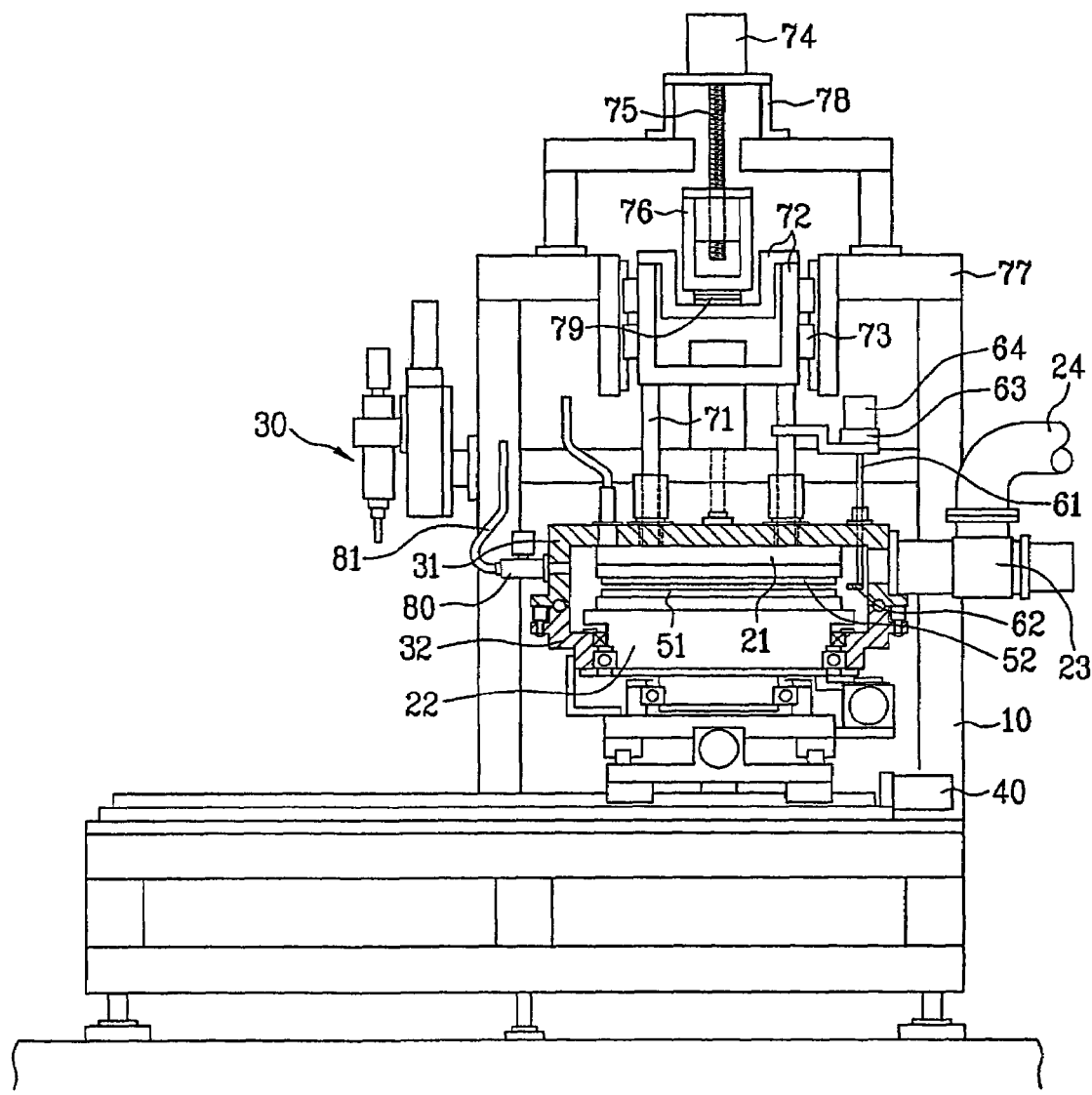
Figure 2:
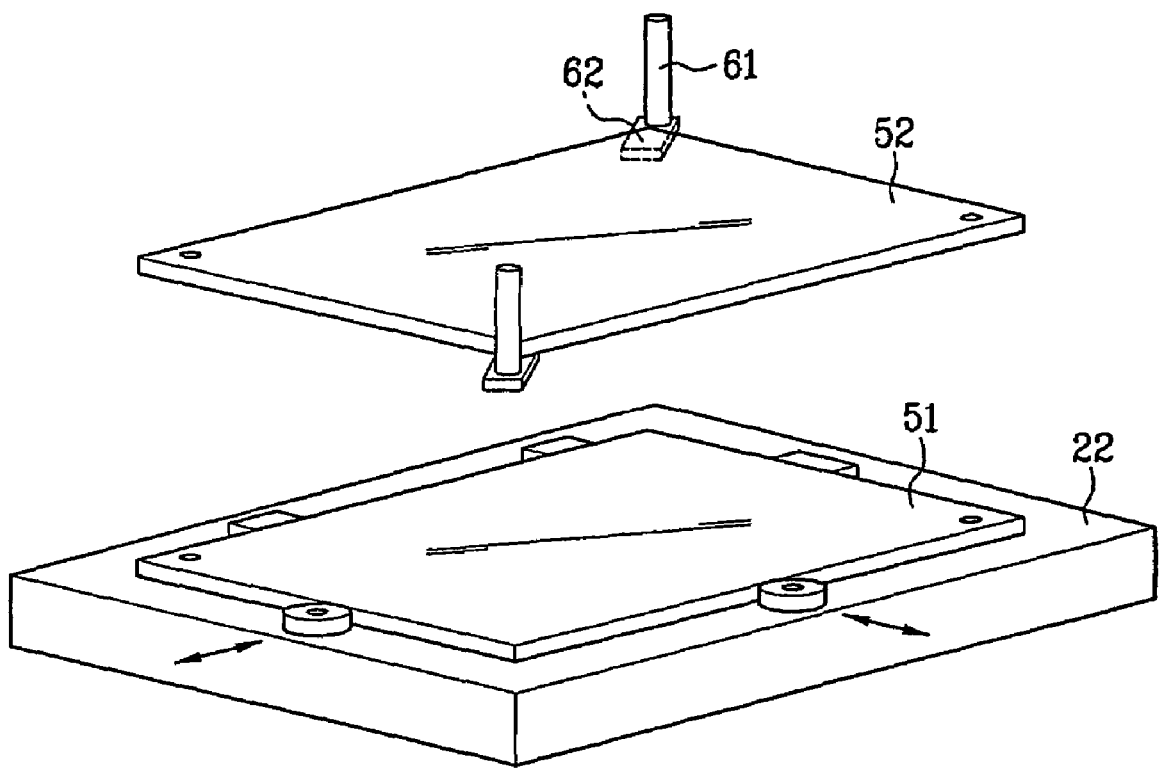
FIG. 2 illustrates a perspective view showing a state of operation of key parts of substrate receiving means in a related art bonding machine.
Figure 3A:
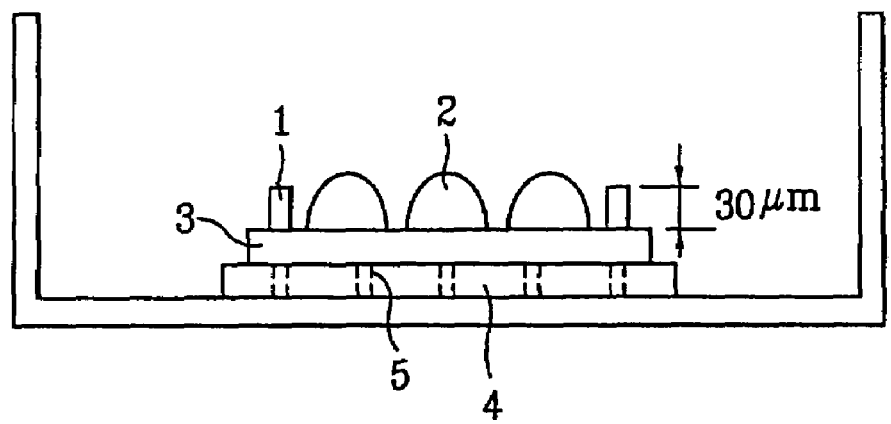
FIGS. 3A-3F illustrate the bonding steps of a related art method for fabricating an LCD having a liquid crystal dropping method applied thereto.
Figure 3B:
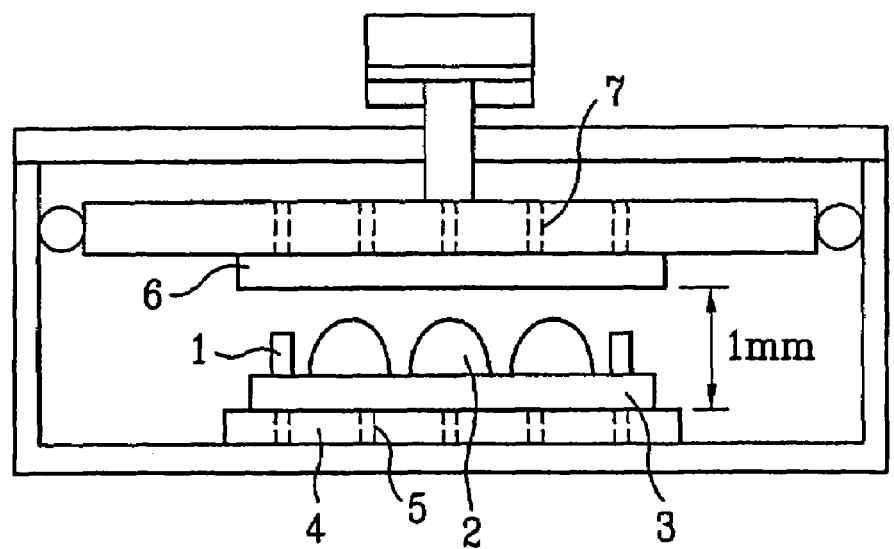
Figure 3C:
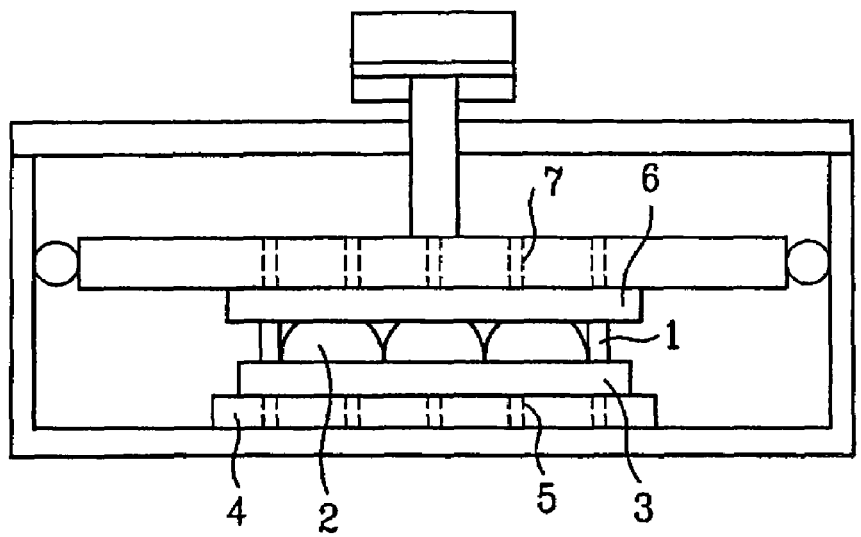
Figure 3D:
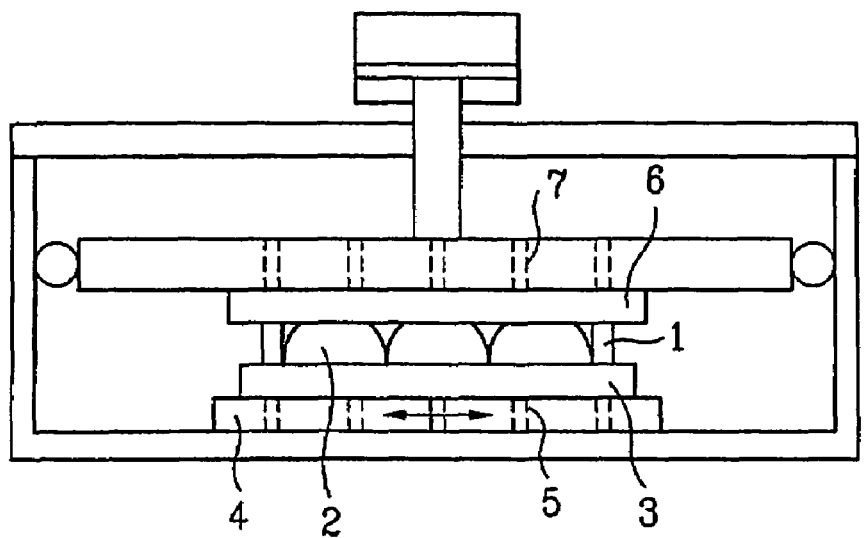
Figure 3E:
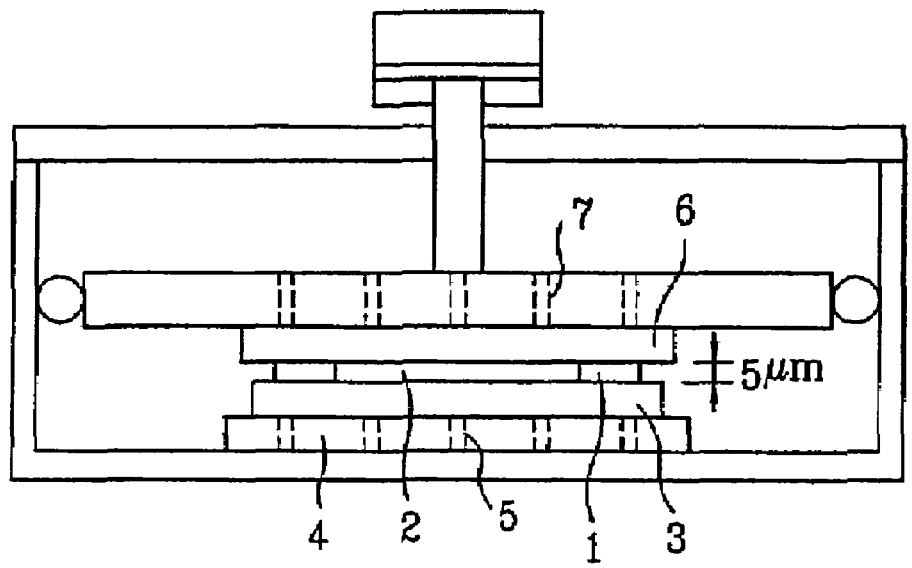
Figure 3F:
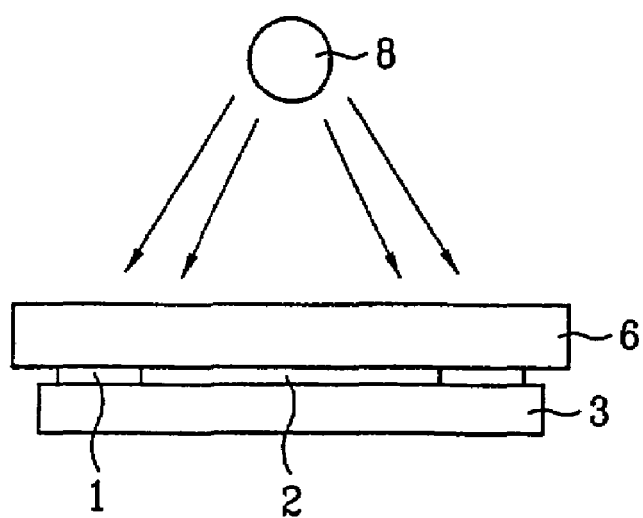

Reference will now be made in detail to an embodiment of the present invention, examples of which are illustrated in the accompanying drawings.

FIGS. 4A-9B illustrate sections of liquid crystal display (LCD) vacuum bonding machines for performing the liquid crystal dispensing method of the present invention. The figures illustrate the method in an order of a process.

As noted in the aforementioned drawings, the bonding machines of the present invention include a bonding chamber 110, a stage part, a stage moving device, and vacuum means.

The bonding chamber 110 is designed as a one piece unit and has an interior designed to selectively be in a vacuum state or an atmospheric pressure state. The bonding chamber 110 also includes a bonding chamber entrance 111 to allow for ingress and egress of a first substrate 510 and a second substrate 520, into or out of the bonding chamber 110.

The bonding chamber 110 may also include at least one air outlet 112, 113, and 114 connected to one side thereof for extracting air from the interior of the bonding chamber 110 by a vacuum means; and a vent pipe or tube 115 corresponding to a vent hole in the bonding chamber 110 connected to one side thereof for introducing air or any suitable gas into the bonding chamber 110 for sustaining the bonding chamber 110 at atmospheric pressure.

The air outlets 112, 113, and 114 include electronically controlled valves 112a, 113a, and 114a, respectively, for selective opening and shutting of tube lines.

The bonding chamber entrance 111 may include a door 111a (not shown) for sealing the bonding chamber entrance 111. The door 111a may be a general sliding or rotating type door, or suitable type of device that can close an opening. In one aspect of the present invention, the sliding or rotating type door may include a sealing member for sealing a gap between the door 111a and the bonding chamber entrance 111, thereby allowing an appropriate vacuum state the detail of which is not shown in the drawing.

The stage parts may be provided in the upper and lower spaces of the bonding chamber 110. They may face each other and include an upper stage 121 and a lower stage 122 for securing the substrates 510 and 520 introduced into the bonding chamber 110.

The upper and lower stages 121 and 122, respectively, may include at least one electrostatic chuck (ESC) 121a provided at opposing surfaces of the upper and lower stages. The upper electrostatic chuck 121a electrostatically holds the second substrate 520 to the upper stage 121, and the lower electrostatic chuck 122a electrostatically holds the first substrate 520 to the lower stage 122. In addition, the upper and lower stages 121 and 122 may also include a plurality of vacuum channels 121b formed therethrough. The vacuum channels enable the substrates 510 and 520 to be arranged on the upper stage 121 and the lower stage 122, respectively.

Although the present embodiment suggests that at least two electrostatic chucks 121a may be utilized, pairs of electrostatic chucks having DC voltages of opposite polarities may also be formed to electrostatically hold the substrates to their respective stages. Alternatively, single electrostatic chucks having DC voltages of opposite polarities applied thereto may also provide the electrostatic charge to provide required holding power.

In one aspect of the present invention, the plurality of vacuum channels 121b may be formed in a center portion and/or along the circumference of the electrostatic chucks 121a and may be connected to single or multiple tubes 121c.

The vacuum channels 121b transmit a vacuum force generated by a vacuum pump 123 connected to the upper stage 121.

The lower stage 122 may include at least one electrostatic chucks 122a on a top surface of the lower stage to provide electrostatic power for holding the substrate, and at least one vacuum channel (not shown) for holding the substrate by vacuum.

The electrostatic chuck and the vacuum channel may or may not be identical to the vacuum channels of the upper stage 121. The arrangement of the electrostatic chuck and the vacuum channels be determined by taking into account the overall fabrication processes of the substrates and/or each liquid crystal coating regions.

The stage moving device includes a moving shaft 131 for selective up and down movement of the upper stage 121, a rotating shaft 131 for selective left and right rotation of the lower stage 122, and driving motors 133 and 134 fitted to the interior or exterior of the chamber 110, that are coupled to the stages 121 and 122 via shafts, respectively.

The stage moving device is not limited to a system in which the upper stage 121 is movable only in the up and down directions, and the lower stage 122 is rotatable only in the left and right directions. Rather, the upper stage 121 may be made to be rotatable in left and right directions, and the lower stage may be made to be movable in up and down directions when the upper stage 121 is provided with a separate rotating shaft (not shown). In addition, the upper stage and lower stage 122 are provided with a separate moving shaft (not shown) for rotation of the upper stage and lower stage 122 and for up and down directional movement of the lower stage 122.

The vacuum means is connected to the air outlets 112-114 on the bonding chamber 110 for extracting air from the interior of the bonding chamber 110, and includes at least more than two units, and preferably five units.

At least one of the vacuum means is a Turbo Molecular Pump (TMP) 210 that has a higher air suction capability compared to other vacuum means, and the rest of the vacuum means are dry pumps 220. In particular, there may be one TMP 210 and four dry pumps 220.

Of the three air outlets 112, 113, and 114 in total connected to the bonding chamber 110, one air outlet ("a first air outlet") 112 is connected to the TMP 210, and the remaining two air outlets 113 ("a second air outlet") and 114 ("a third air outlet") are connected to two pairs of the dry pumps, respectively.

Moreover, there may be five air outlets so that one of the air outlets is connected to the TMP 210 and the other four outlets are connected to the other four dry pumps, respectively.

Along with this, the present invention suggests making a system by connecting gas supplying means 300 that regulates the amount of air or gas supplied to the vent pipe 115 and is connected to the bonding chamber 110.

The gas supplying means 300 includes a gas charge part 310, having air or gas storage therein, to sustain the atmospheric pressure in the bonding chamber 110, and a valve 320 for selective opening and shutting of the vent pipe 115 as required.

Moreover, the present invention can make a system inclusive of a pump for forced pumping of the air or gas charged in the gas charge part 310 to the vent tube 115 by a selective pressure. That is, the system for sustaining the interior of the bonding chamber at the atmospheric pressure is not limited to the valve, only.

However, since the air or gas can infiltrate into the bonding chamber 110 by itself through a minute gap as the interior of bonding chamber 110 is at a vacuum, the forced pumping may not be necessarily used. According, the present invention suggests a system with the valve 320 applied thereto for selectively opening and shutting the vent tube 115 as much as required instead of the pump.

Moreover, if the vacuum of the bonding chamber becomes greater than the vacuum applied to the stages during evacuation of the bonding chamber 110, when the stages 121 and 122, respectively have the first and second glass substrates held respectively thereto, the stages to lose vacuum holding power and the second glass substrate can fall off the upper stage and drop onto the first glass substrate. To prevent this event from occurring, a substrate receiving means 400 is provided to the bonding chamber for supporting the substrate to the upper stage 121. In this instance, the substrate receiving means 400 supports a central part of the substrate of the non-active region, rather than supporting only the corner parts of the substrate.

It is noted that FIGS. 4A, 5A, 6A, 7A, 8A and 9A show one embodiment and FIGS. 4B, 5B, 6B, 7B, 8B and 9B show another embodiment. In particular, the vent 300, the dry pumps 220 and the TMP 210 are in different locations in FIGS. 4B, 5B, 6B, 7B, 8B and 9B to show that different locations can be used for such elements. For example, FIGS. 4B, 5B, 6B, 7B, 8B and 9B show the vent 300 at the top of the bonding chamber 110, the dry pumps 220 at the bottom of the bonding chamber 110, and the TMP 210 at the side of the bonding chamber 110, whereas FIGS. 4A, 5A, 6A, 7A, 8A and 9A show the vent 300 at the side of the bonding chamber 110, the dry pumps 220 at the side of the bonding chamber 110, and the TMP 210 at the top of the bonding chamber 110. Other permutations of different suitable locations for these elements are contemplated in the present invention.

Figure 12:
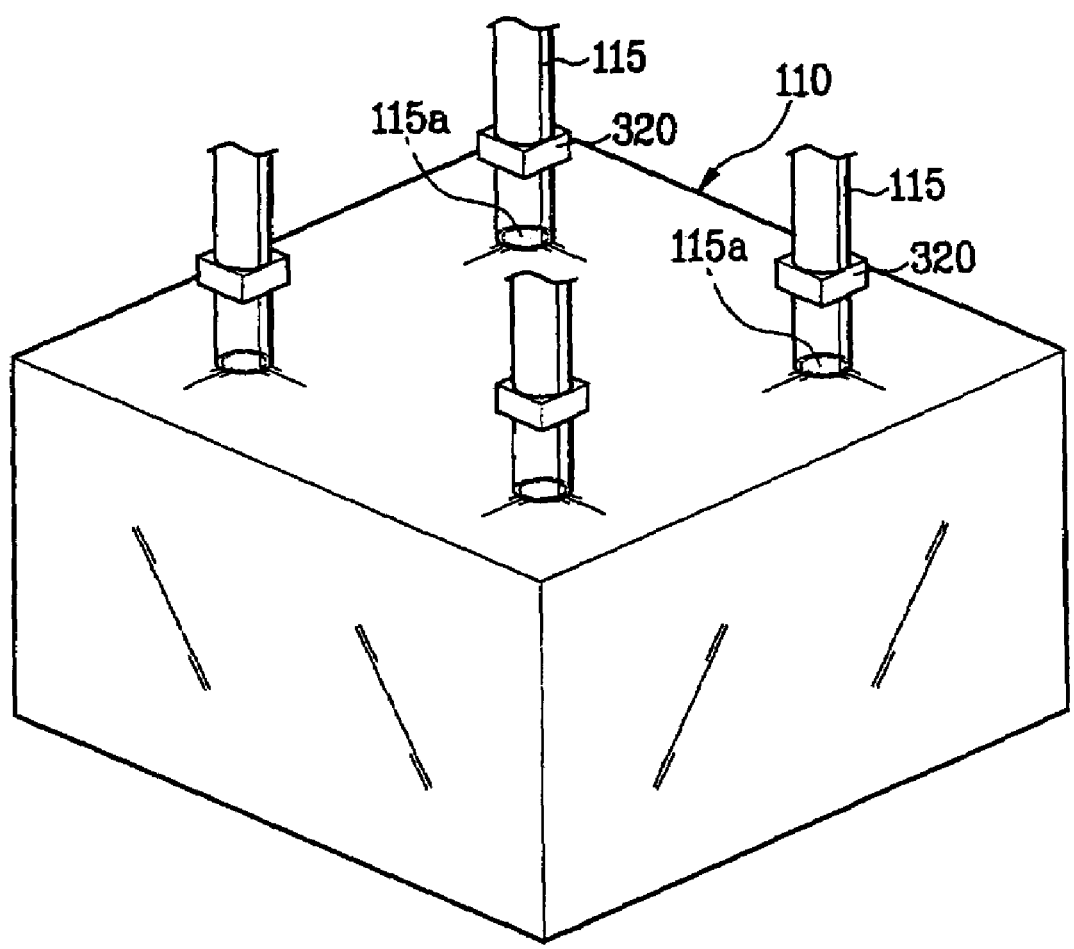
FIG. 12 illustrates multiple vent holes at the top of the bonding chamber in accordance with the present invention.
Figure 13:
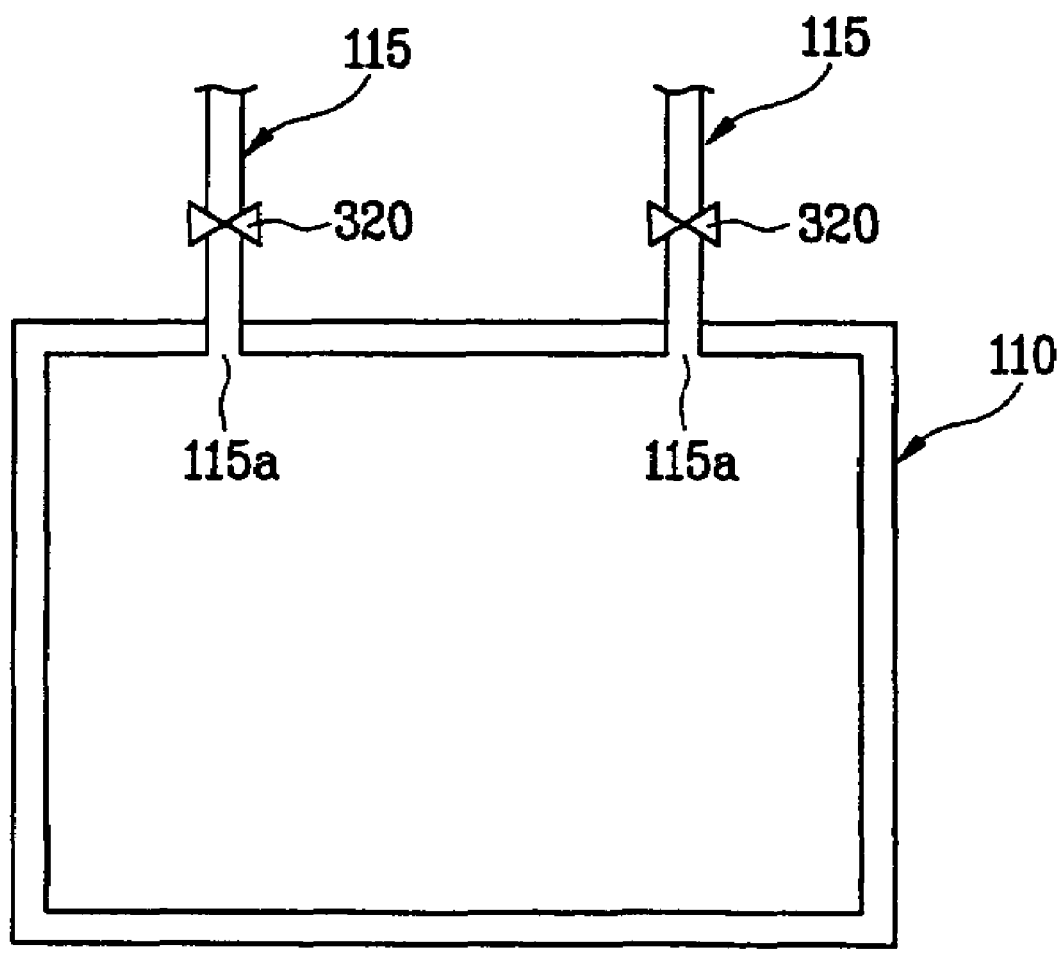
FIG. 13 is a cross-sectional view of FIG. 12.
Figure 14:
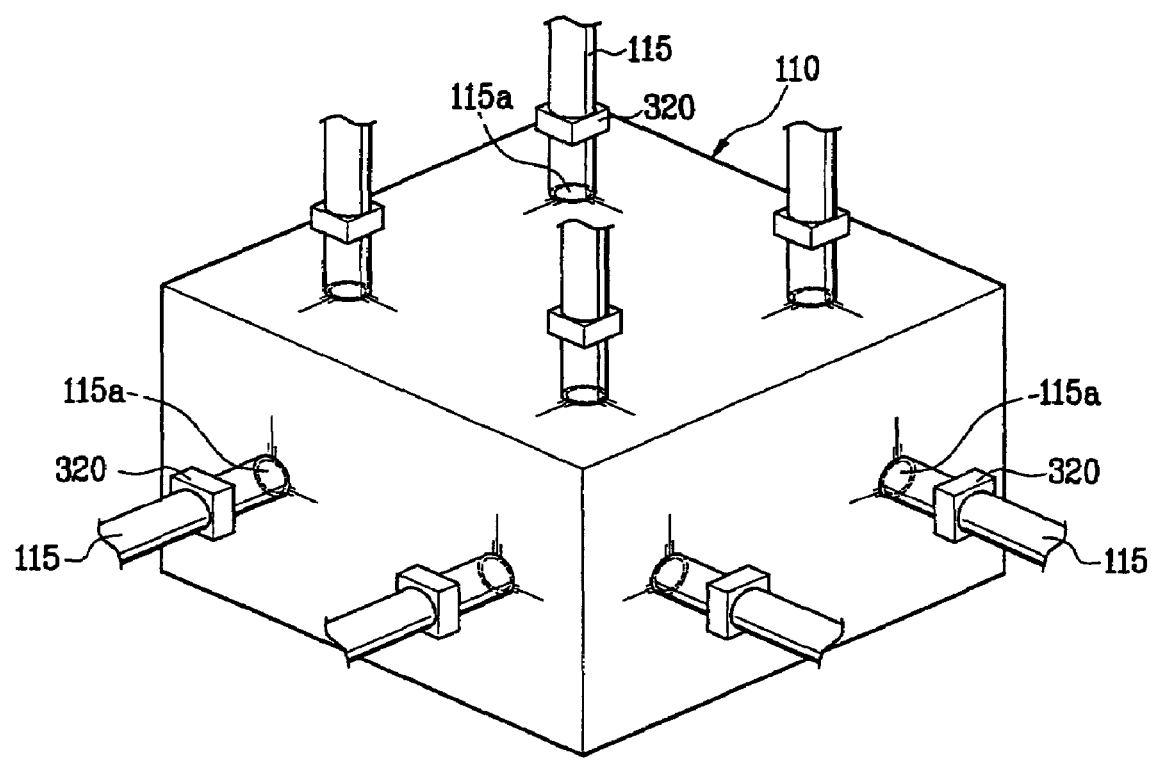
FIG. 14 illustrates multiple vent holes at all sides of the bonding chamber in accordance with the present invention.
Figure 15:
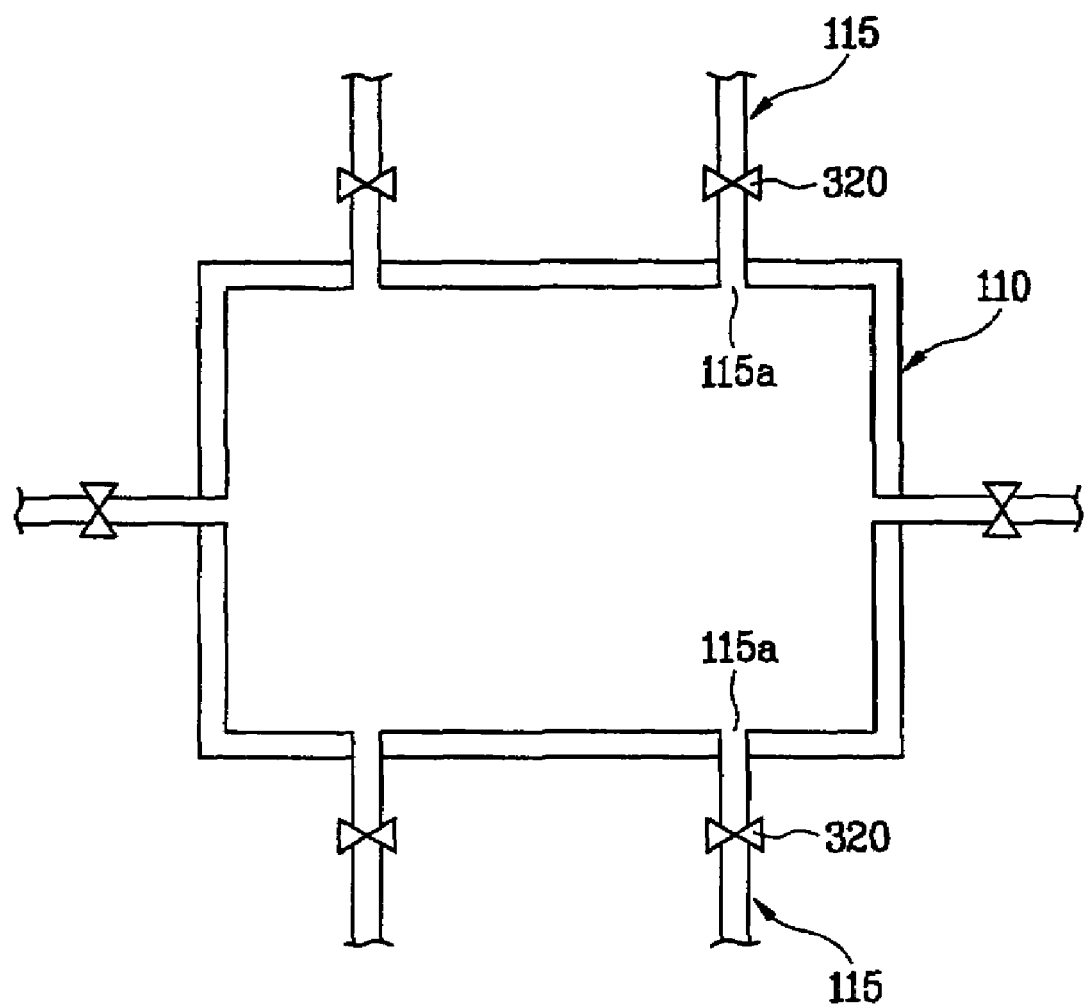
FIG. 15 is a cross-sectional view of FIG. 14.

For example, FIGS. 12 and 13 show multiple vent holes 115a at the top of the bonding chamber while FIGS. 14 and 15 show multiple vent holes 115a at all sides of the bonding chamber. The plurality of vent holes may be formed at the top of the bonding chamber. The plurality of vent holes may be formed at the top, bottom and sides of the bonding chamber. At least two of said vent holes may be formed at the top of the bonding chamber, at least one of the vent holes may be formed at least at one side of the bonding chamber, and at least two of the vent holes may be formed at the bottom of the bonding chamber. The plurality of vent holes may be formed at the top surface and the side surface of the bonding chamber. The plurality of vent holes may be formed at the top surface and the bottom surface of the bonding chamber. The top surface may have at least two vent holes and the side surface may have at least two vent holes.

FIGS. 10A-10E illustrate sections showing the steps of a method for fabricating an LCD in accordance with an embodiment of the present invention. FIG. 11 illustrates a flow chart showing the steps of a method for fabricating LCDs having the liquid crystal dispensing method applied thereto in accordance with an embodiment of the present invention. Next, the method for fabricating LCDs by using the bonding machines of the foregoing present invention will be explained, with reference to FIGS. 10A-10E, and 4A-9B.

The method for fabricating LCDs includes the steps of loading the two substrates into the vacuum bonding chamber, evacuating the bonding chamber, bonding the two substrates, venting the bonding chamber for uniform application of pressure to the bonded substrates, and unloading the pressed two substrates from the vacuum bonding chamber.

Figure 10A:
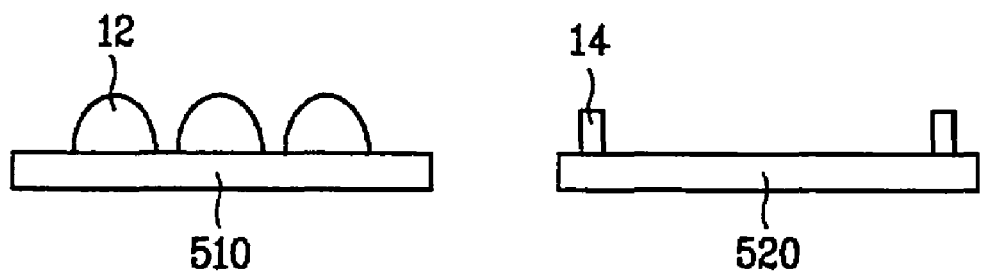
FIGS. 10A-10E illustrate sections showing the steps of a method for fabricating LCDs having a liquid crystal dispensing method applied thereto in accordance with an embodiment of the present invention.
Figure 11:
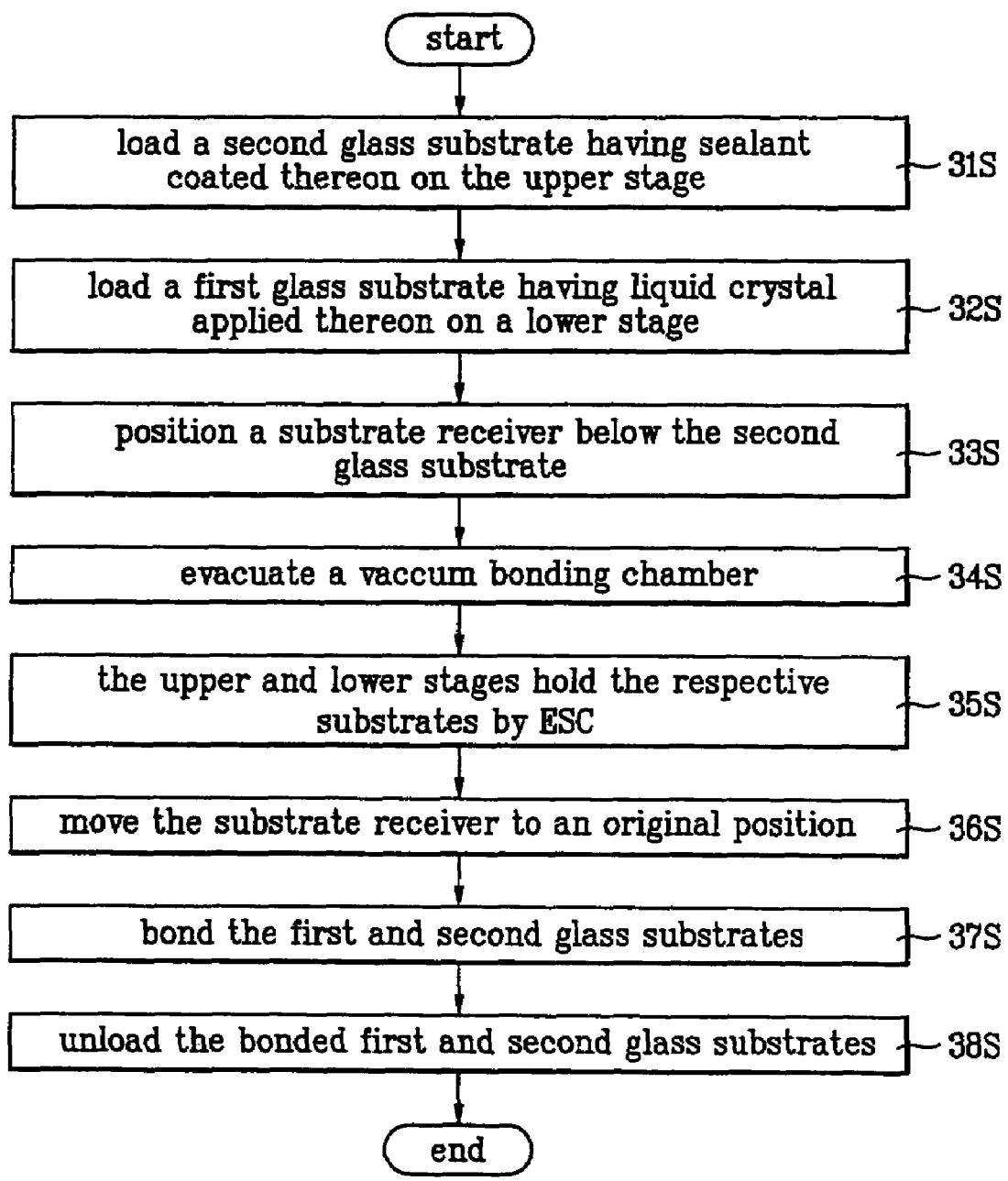
FIG. 11 illustrates a flow chart showing the steps of a method for fabricating LCDs in accordance with an embodiment of the present invention.

Referring to FIG. 10A, liquid crystal 12 is dropped onto a first glass substrate 510 and sealant 14 is coated on a second substrate 520. Before loading the substrates into the bonding chamber, the second glass substrate 520 having the sealant 14 coated thereon may be cleaned by Ultra Sonic Cleaner (USC), thereby enabling the removal particles formed during the previous processes. The USC is possible as the second glass substrate 520 has no liquid crystal dropped thereon.

One of the first and second substrates is a substrate having the thin film transistor arrays formed thereon, and the other substrate is a substrate having the color filter layers formed thereon. In this invention, the liquid crystal dropping and the sealant coating may be made applied to only one of the first and second substrates. Only positioning of the substrate having the liquid crystal dropped thereon on the lower stage, and the other substrate on the upper stage is required.

Figure 4A:
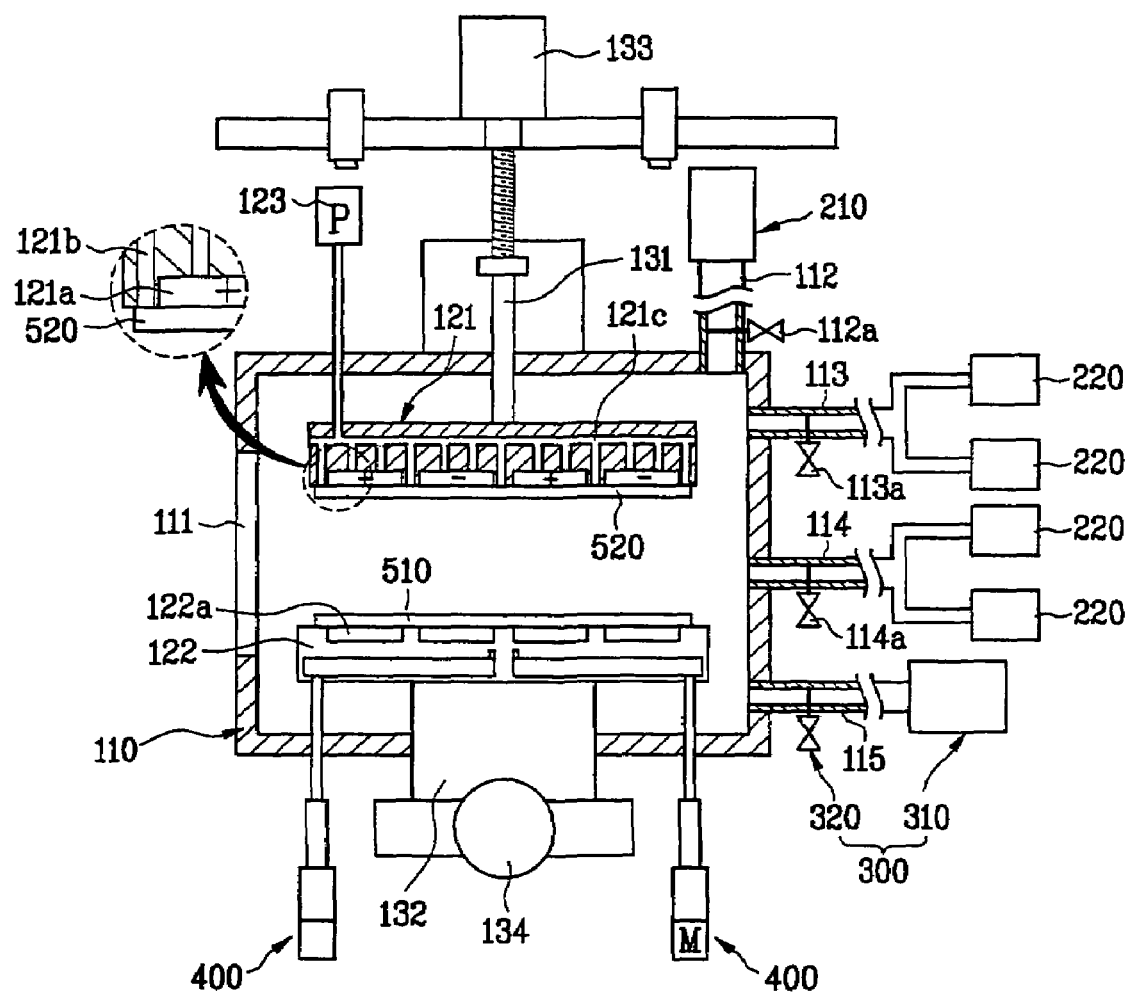
FIGS. 4A and 4B illustrate a state of operation of bonding machines according to the present invention, after the substrates have been loaded.
Figure 4B:
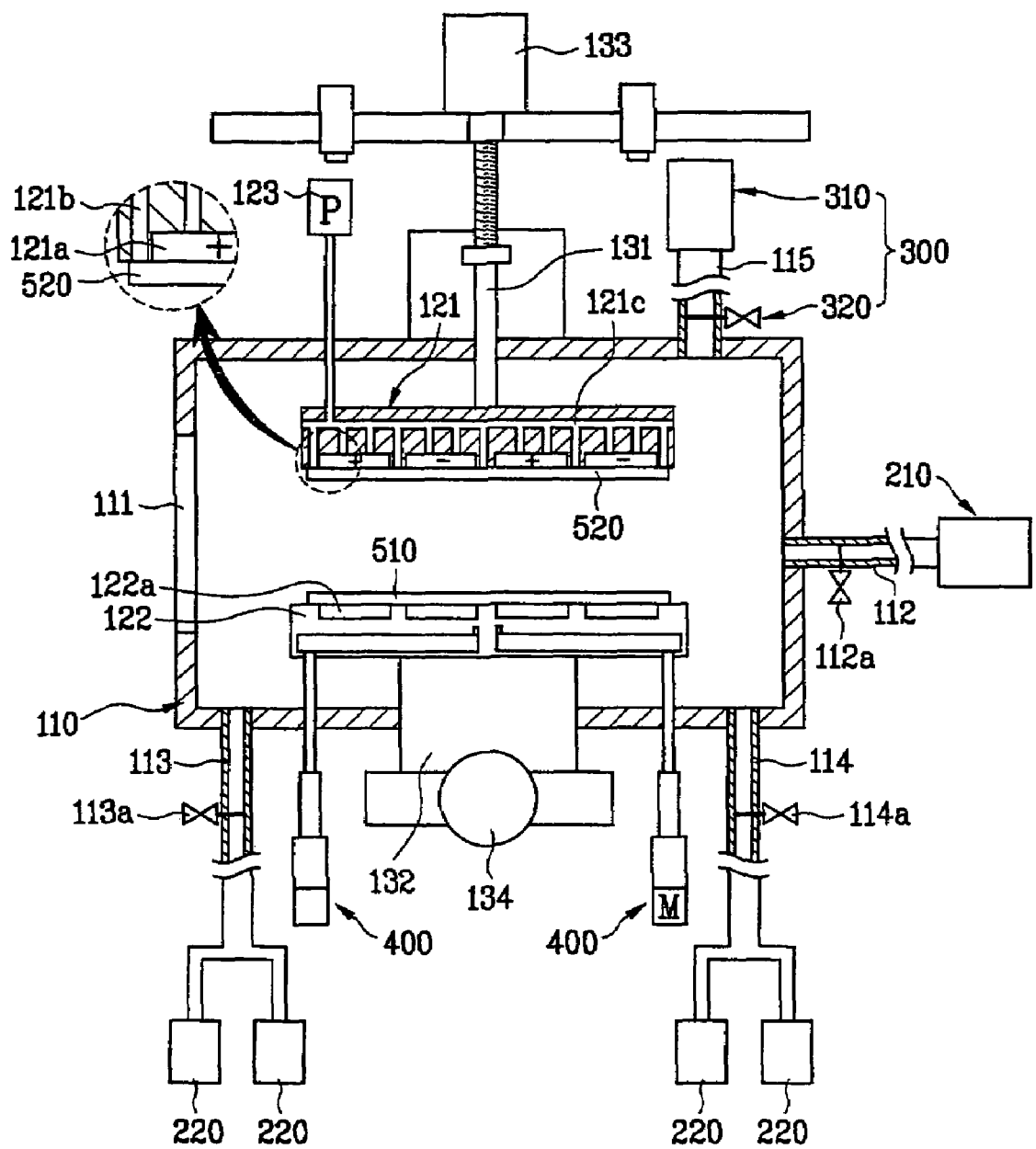
Figure 10B:
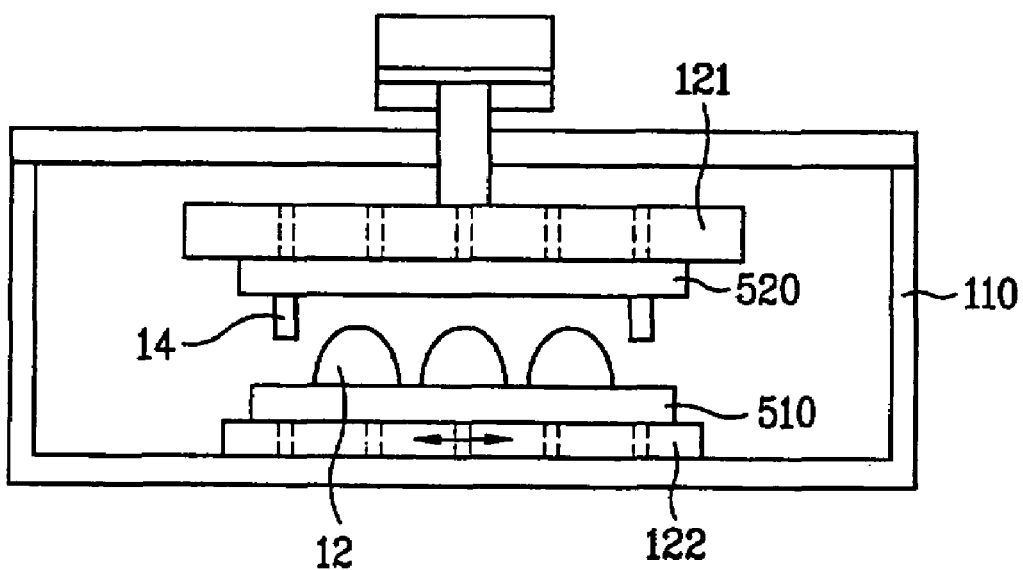
Figure 10C:
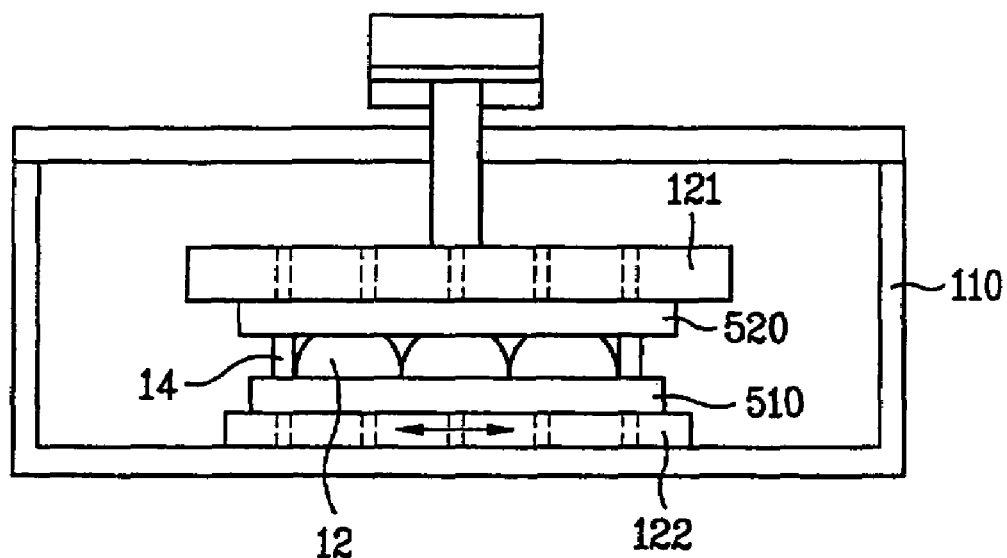
Figure 10D:
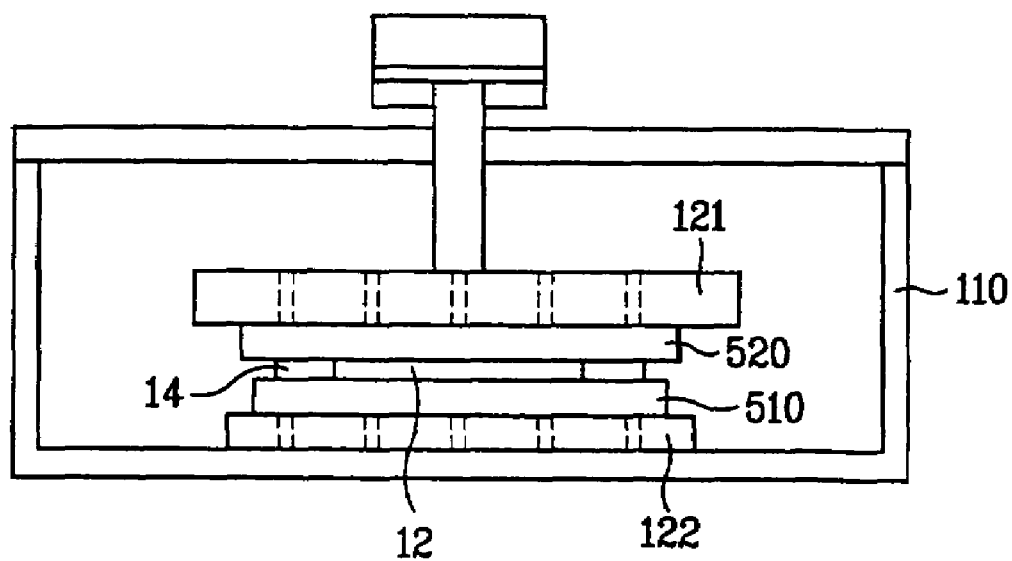

Referring to FIG. 4A, 4B, or 10B, schematically illustrating the loading step, the second glass substrate 520 having the sealant 14 coated thereon is held to the upper stage 121 by vacuum. The second glass substrate 520 with sealant coated thereon is positioned faced down (31S) on the upper stage 121. The first glass substrate 510 having the liquid crystal 12 dispensed thereon is held to the lower stage 122 by vacuum (32S). At this time the vacuum bonding chamber 110 is at an atmospheric pressure state.

The second glass substrate 520 having the sealant 14 coated thereon is held by a loader of a robot (not shown) with the face on which the sealant 14 is coated facing down and brought into the vacuum bonding chamber 110. In this state, the upper stage 121 in the vacuum bonding chamber 110 is moved down, and the lower stage holding the second glass substrate 520 may be moved up. In addition, instead of a vacuum holding the upper and lower substrates, the electrostatic chuck may be used for one substrate or both simultaneously.

Next, the loader of the robot is moved out of the vacuum bonding chamber 110, and the first glass substrate 510 having the liquid crystal 12 dropped thereon is placed over the lower stage 122 in the vacuum bonding chamber 110 by the loader of the robot, so that the lower stage 122 vacuum channels hold the first substrate 510. When respective loading of the substrates 510 and 520 on the stages 121 and 122 are finished, the door in the bonding chamber entrance 111 is closed in order to seal the interior of the bonding chamber 110. It is preferable that the second substrate 520 having the sealant coated thereon be loaded on the upper stage 121 first and that the first substrate 510 having the liquid crystal dropped thereon loaded on the lower stage 122 second. This is because if the first substrate 510 is loaded first and the second substrate 520 is loaded second, foreign matter may fall onto the first substrate 510 when the second substrate 520 is loaded.

The evacuation step is progressed in two stages. That is, after the substrates 510 and 520 are held to the upper and lower stages 121 and 122, respectively, and the chamber door is closed a first evacuation is started. After bringing the substrate receiver 400 below the upper stage 121 and placing down the second substrate 520 held to the upper stage 121 on the substrate receiver 400, or bringing the upper stage 121 and the substrate receiver 400 to be at a certain distance from the upper stage 121 holds the substrate. Next, a second evacuation of the vacuum bonding chamber is conducted. In this instance, the second evacuation is made faster than the first evacuation, and the first evacuation is made such that the vacuum in the vacuum bonding chamber is not higher than the vacuum channel force of the upper stage.

Without dividing the evacuation into first and second stages, the evacuation of the bonding chamber 110 may be started at a fixed rate, and the substrate receiver 400 may be brought below the upper stage during the evacuation. It is required that the substrate receiver 400 is brought below the upper stage 121 before the vacuum in the vacuum bonding chamber becomes higher than the vacuum holding force in upper stage 121.

That is, dry pumps 220 in the vacuum means are put into operation for evacuation of the bonding chamber 110 through the second and third air outlets 113 and 114 and are operated at 10-30 Kl/min (preferably, 23 Kl/min). For example, the valves 113a and 114a on the second and third air outlets 113 and 114 are opened during the first evacuation.

It should be noted that if the vacuum force in the bonding chamber 110 becomes higher than the vacuum force that holds the substrate 520 to the upper stage 121 (i.e., the interior of the bonding chamber 110 reaches a higher vacuum force than in the vacuum channels), then the substrate 520 held to the upper stage 520 may drop from the upper stage 121.

Figure 5A:
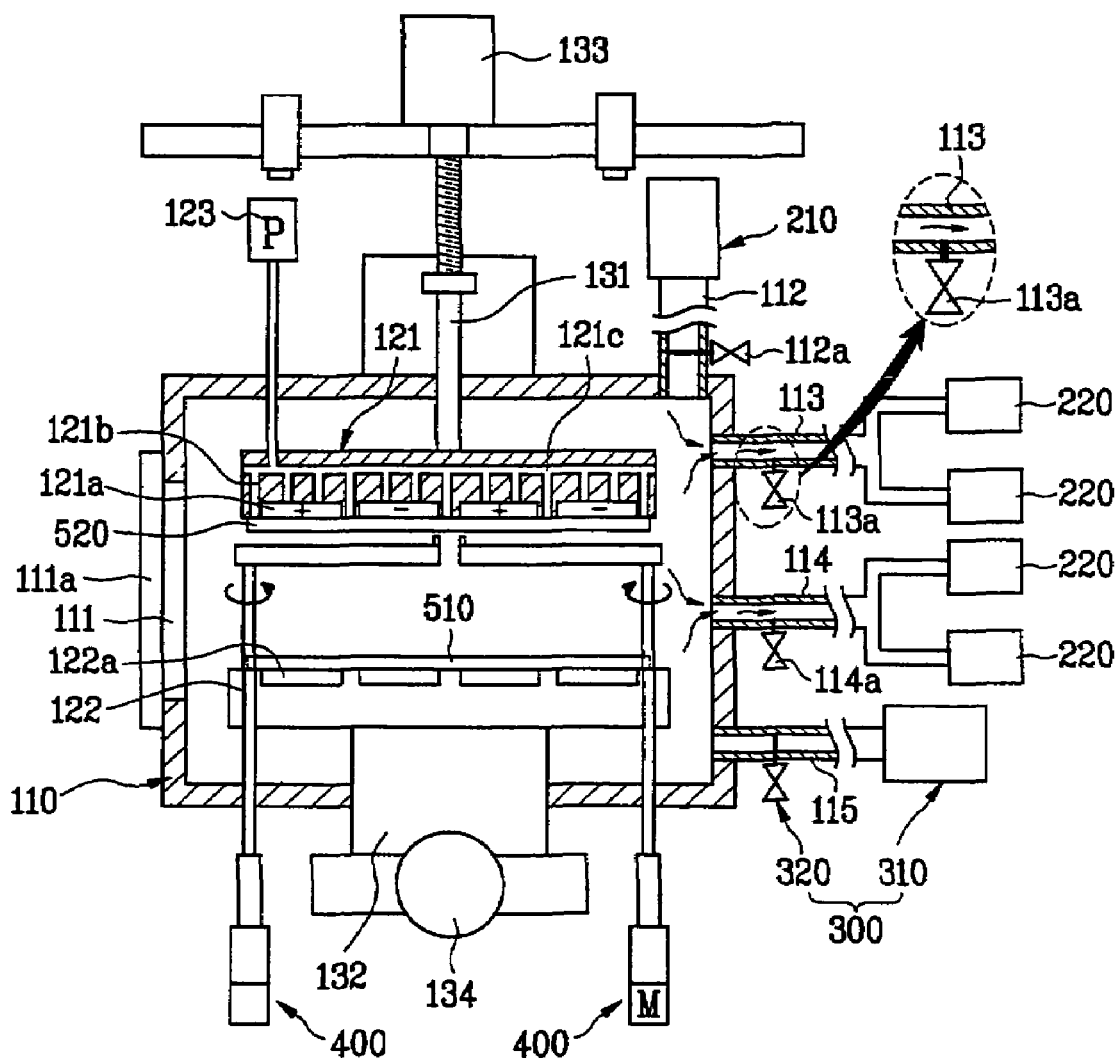
FIGS. 5A and 5B illustrate a state of operation of bonding machines according to the present invention, in which a low vacuum pump evacuates an interior of a bonding chamber to turn the bonding chamber into a vacuum state.
Figure 5B:
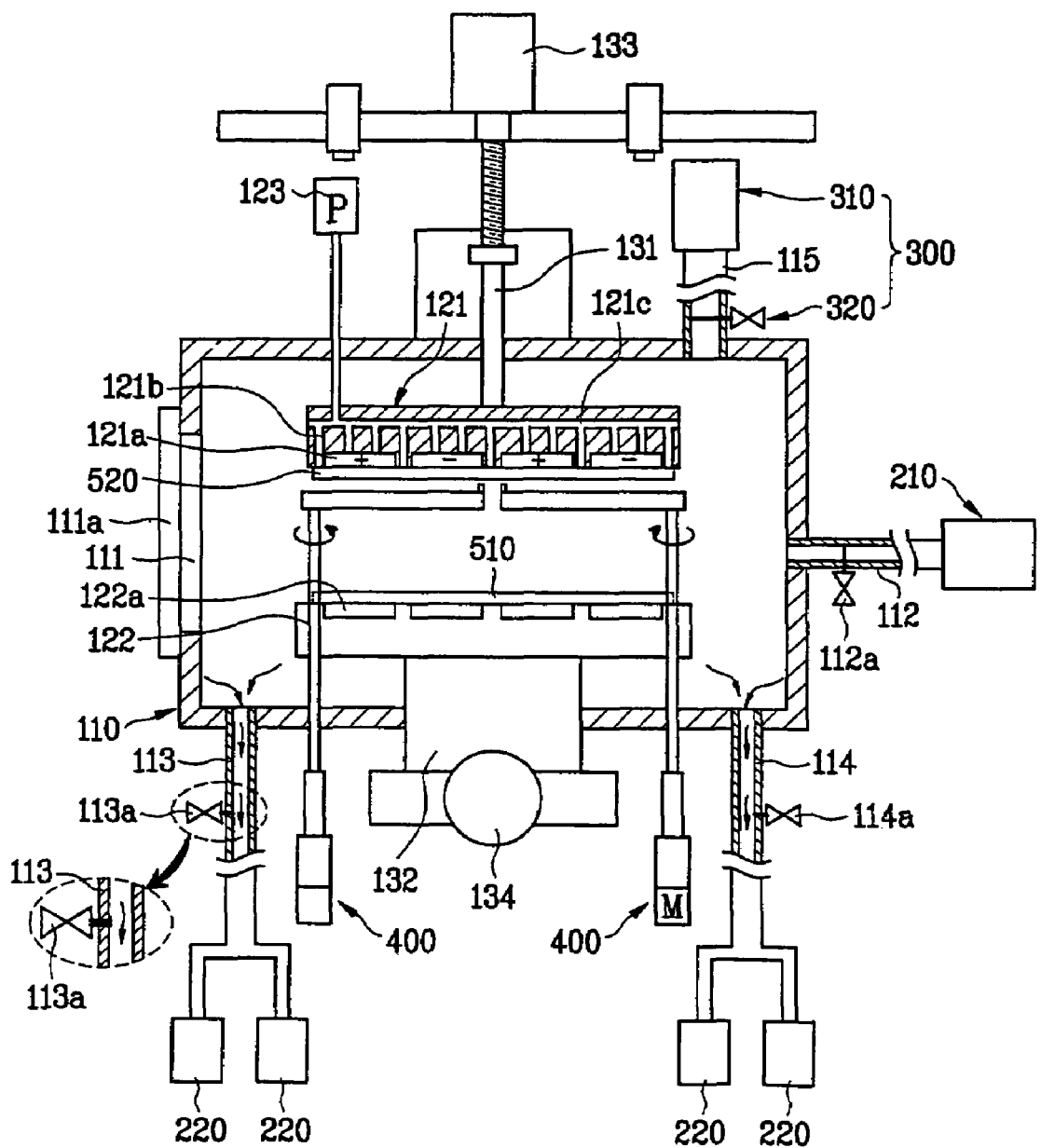

Referring to FIGS. 5A and 5B, in order to prevent the substrate 520 from dropping and/or being broken, a substrate receiving means 400 temporarily receives the substrate 520 held to the upper stage 121 (33S). The substrate receiving means 400 moves during the slow evacuation before the bonding chamber 110 reaches to a high vacuum. The substrate receiver 400 is contacted with the second substrate 520 by the following method.

For example, after the second substrate 520 and the substrate receiver 400 are brought closer together by either moving the upper stage 121 down or moving the substrate receiver 400 up or both, the second substrate 520 is placed down on the substrate receiving means 400 by releasing the vacuum channel force of the upper stage 121.

Thus, the second glass substrate 520 held to the upper stage may be arranged on the substrate receiver 400 before evacuating the vacuum bonding chamber, or the upper stage having the second glass substrate held thereto and the substrate receiver may be brought to be at a certain distance so that the second glass substrate 520 is arranged on the substrate receiver 400 from the upper stage 121 during the evacuation of the chamber. Moreover, other means for fastening the substrates may additionally be provided as there may be an occurrence of airflow in the chamber at the initial stage, which can shake the substrates when the evacuation of the vacuum bonding chamber is started.

The step of evacuating the bonding chamber 110 is not necessarily carried out after the bonding chamber entrance 111 is closed by the door 111a.

Considering an initial evacuation that is slow, the bonding chamber entrance 111 may be closed during the evacuation.

Moreover, the movement of the substrate receiving means 400 to a location for receiving the second substrate 520 is not necessarily required until the bonding chamber 110 reaches a high vacuum, but the movement of the substrate receiving means 400 can made before the evacuation of the bonding chamber. However, for enhancing the fabrication process efficiency, it is preferable that the substrate receiving means 400 is moved during the evacuation of the bonding chamber 110.

Figure 6A:
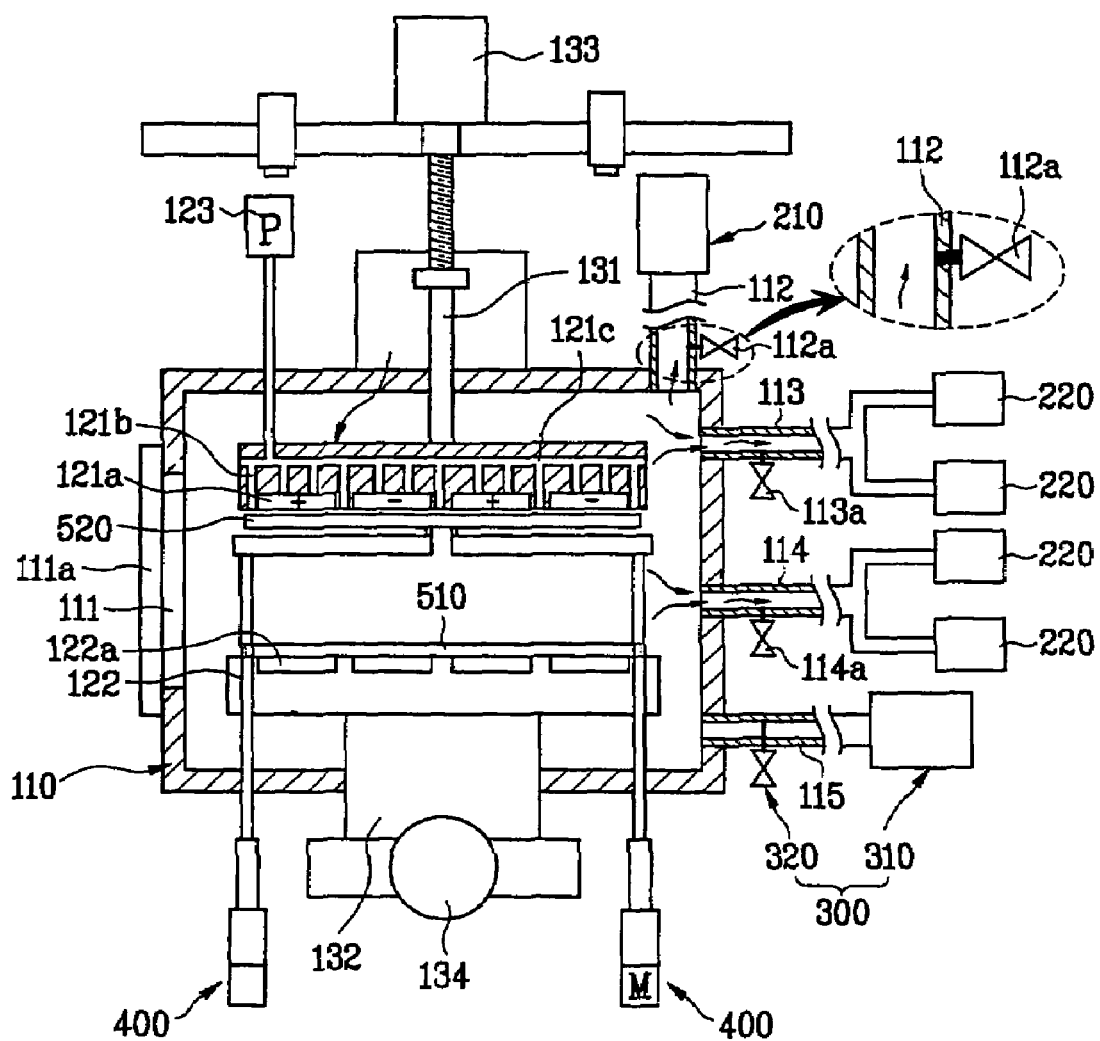
FIGS. 6A and 6B illustrate a state of operation of bonding machines according to the present invention, in which a high vacuum pump evacuates an interior of a bonding chamber to turn the bonding chamber into a vacuum state.
Figure 6B:
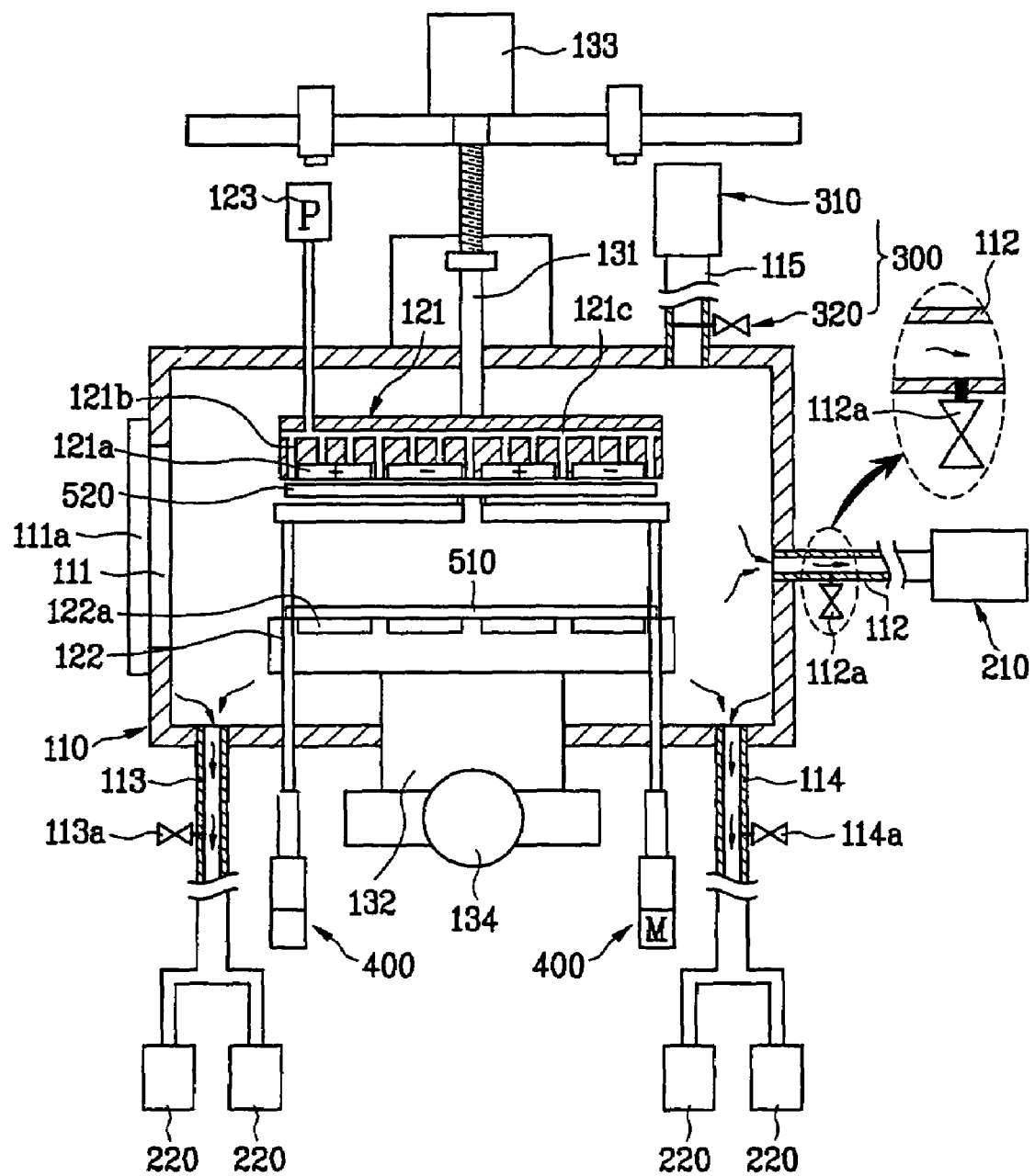
Figure 7A:
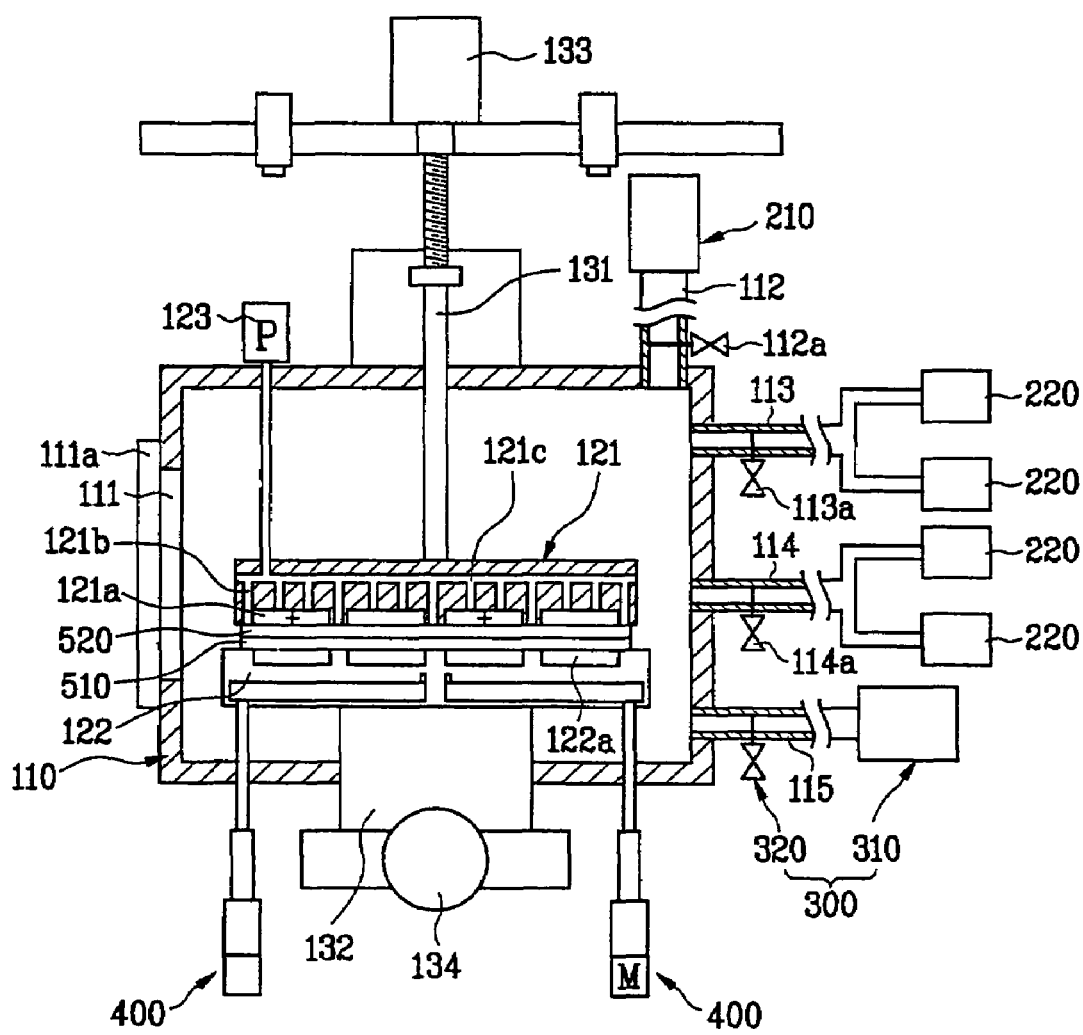
FIGS. 7A and 7B illustrate a state of operation of bonding machines according to the present invention, in which a pressure is applied to bond the substrates.
Figure 7B:
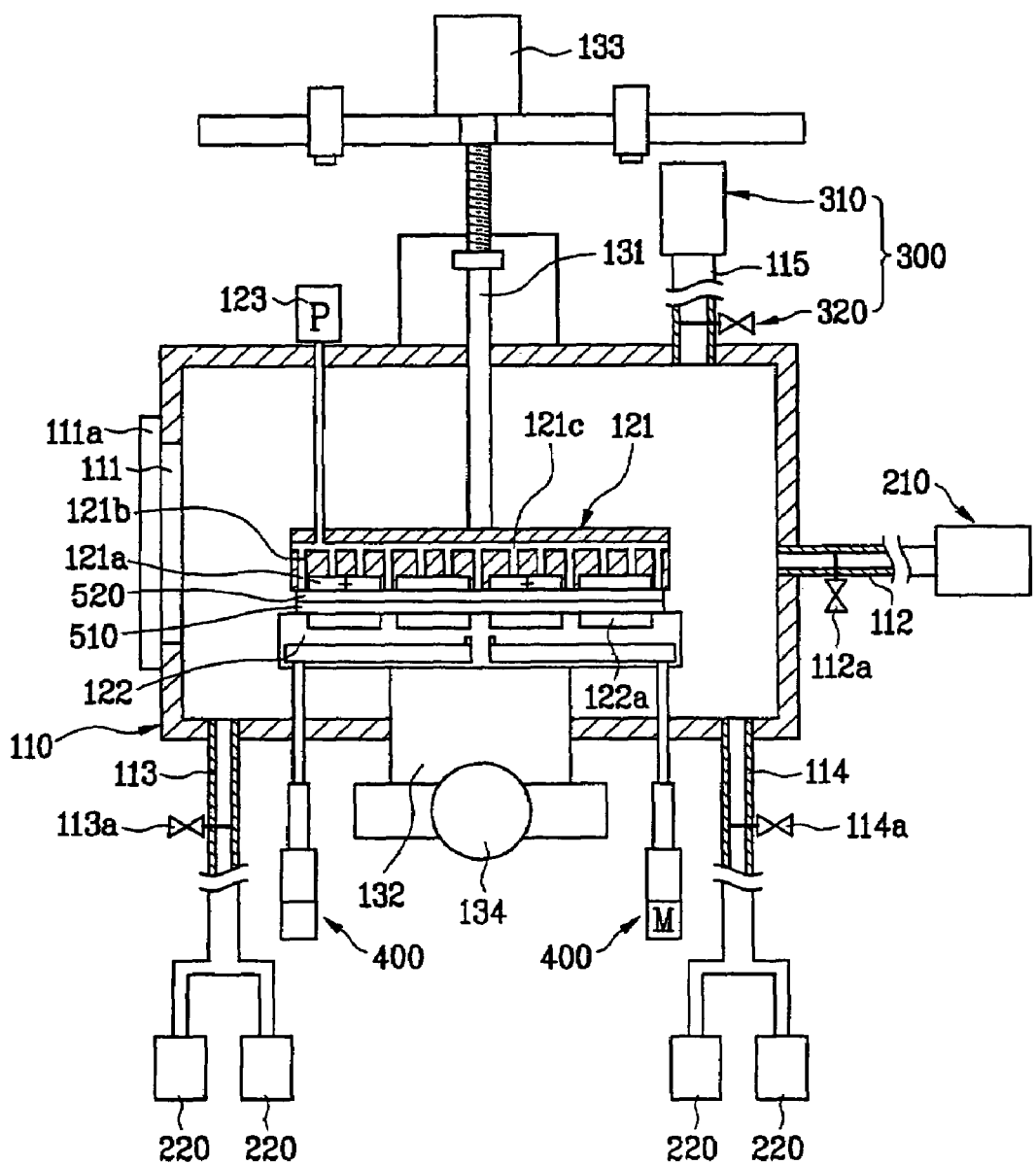

Then, referring to FIGS. 6A and 6B, when the vacuum of the bonding chamber 110 reaches a pressure of approximately 50 Pa (preferably below 13 Pa) by the continuous evacuation of the dry pumps 220, the substrate 520 is held to the upper stage 121 and is supported on the substrate receiving means 400. Next, the valve 112a is opened to open the first air extraction tube 112 and the TMP 210 is put into operation, for the second evacuation (34S).

In this instance, the TMP 210 evacuates the bonding chamber 110 through the first air extraction tube 112 rapidly at a rate of approx. 0.1-5 Kl/min (preferably, 1.1 Kl/min).

However, the operation of TMP 210 and the dry pumps 220 is not limited to performing the rapid evacuation of the chamber at a particular time. For example, it is not limited to the time when the substrate 520 held to the upper stage 121 and supported on the substrate receiving means 400. That is, a driving control may be utilized to reach the high vacuum by selective regulation of the valves 112a, 113a, and 114a, fitted on the air outlets 112, 113, and 114.

When the vacuum of the bonding chamber 110 reaches a desired pressure range, the foregoing steps are conducted. For example, when the vacuum of the bonding chamber 110 reaches a pressure below 0.01 Pa (preferably, 0.67 Pa), the operation of the TMP is stopped. In this instance, the valve 112a fitted to the first air outlet 112 closes the first air outlet 112.

The vacuum within the vacuum bonding chamber 10 may have a pressure in a range of about $1.0 \times 10^{-3}$ Pa to 1 Pa for in-plane switching (IPS) mode liquid crystal display devices, and about $1.1 \times 10^{-3}$ Pa to $10^2$ Pa for twisted nematic (TN) mode liquid crystal display devices.

Evacuation of the vacuum bonding chamber may be carried out in two stages, thereby preventing deformation or shaking of the substrates in the vacuum bonding chamber that may be caused by rapid evacuation of the vacuum bonding chamber.

Once the vacuum bonding chamber 110 is evacuated to a preset vacuum pressure, the upper and lower stages 121 and 122 bias the first and second glass substrates 510 and 520, respectively by electrostatic chuck (35S) and the substrate receiver 400 is brought to the home position (36S). That is, the second substrate 520 is temporarily supported on the substrate receiving means 400 and is held at the upper stage 121, and the first substrate 510 on the lower stage 122 is held at the lower stage 122.

Using electrostatic charge, the first and second substrates may be fixed to their respective stages by applying negative/positive DC voltages to two or more plate electrodes formed at the stages. When the negative/positive voltages are applied to the plate electrodes, a coulomb force is generated between the conductive layer (e.g., transparent electrodes, common electrodes, pixel electrodes, etc.) formed on the substrate and the stage. When the conductive layer formed on the substrate faces the stage, approximately 0.1-1 KV is applied to the plate electrodes. When the substrate contains no conductive layer formed facing the stage, approximately 3-4 KV is applied to the plate electrodes. An elastic sheet may be optionally provided to the upper stage.

Referring to FIGS. 10C, 10D, 7A and 7B, after the two glass substrates 510 and 520 are held by their respective stages 121 and 122 by electrostatic charge, the two stages are moved into proximity such that the two glass substrates may be bonded (37S). The first and second glass substrates are pressed by moving either the upper stage 121 or the lower stage 122 in a vertical direction, while varying speeds and pressures at different stage locations. Until the time the liquid crystal 12 on the first glass substrate 510 and the second glass substrate 520 come into contact, or until the time the first glass substrate 510 and the sealant 14 on the second glass substrate 520 come into contact, the stages may be moved at a fixed speed or fixed pressure and the pressure may be incrementally increased from the time of contact to a final pressure. After the load cell fitted to a shaft of the movable stages senses contact, the glass substrates are pressed together with increasing pressures. For example, at contact the substrates are pressed at a pressure of about 0.1 ton; at an intermediate stage they are pressed to a pressure of about 0.3 ton; at an end stage they are pressed to a pressure of about 0.4 ton at an end stage; and finally they are pressed to a pressure of about pressure of 0.5 ton at the final stage (see FIG. 10D).

Although it is illustrated that the upper stage presses down onto the substrate by means of one shaft, a plurality of shafts may independently apply and control pressure using an individual load cell. If the lower stage and the upper stage are not leveled or fail to press down uniformly, any number of predetermined shafts may be pressed at a lower or higher pressure in order to obtain a uniform bonding of the seal.

Figure 10E:
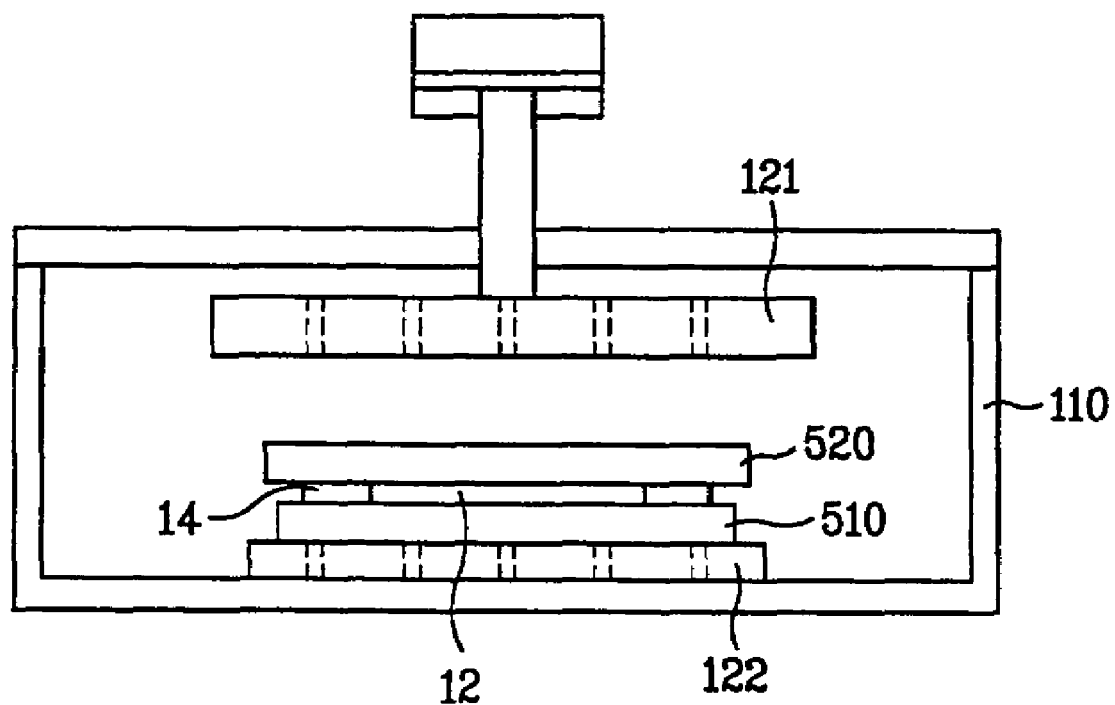

Referring to FIG. 10E, after the foregoing process bonds the two substrates and after the electrostatic charge has been turned off to the upper and lower stages, the upper stage 121 is moved up in order to separate the upper stage 121 from the bonded two glass substrates 510 and 520.

Figure 8A:
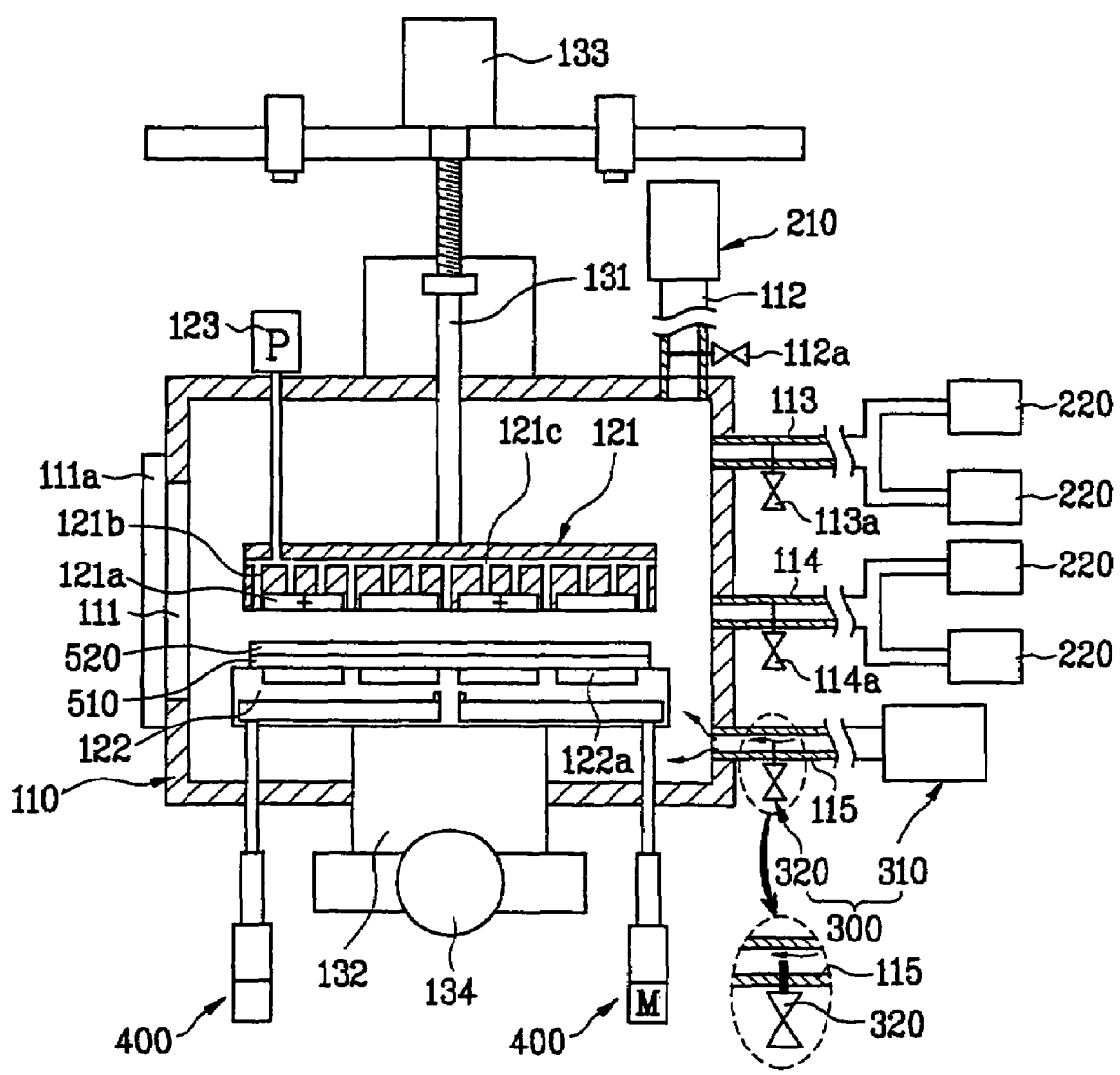
FIGS. 8A and 8B illustrate a state of operation of bonding machines according to the present invention, in which an interior of a bonding chamber is slowly turned into an atmospheric pressure state.
Figure 8B:
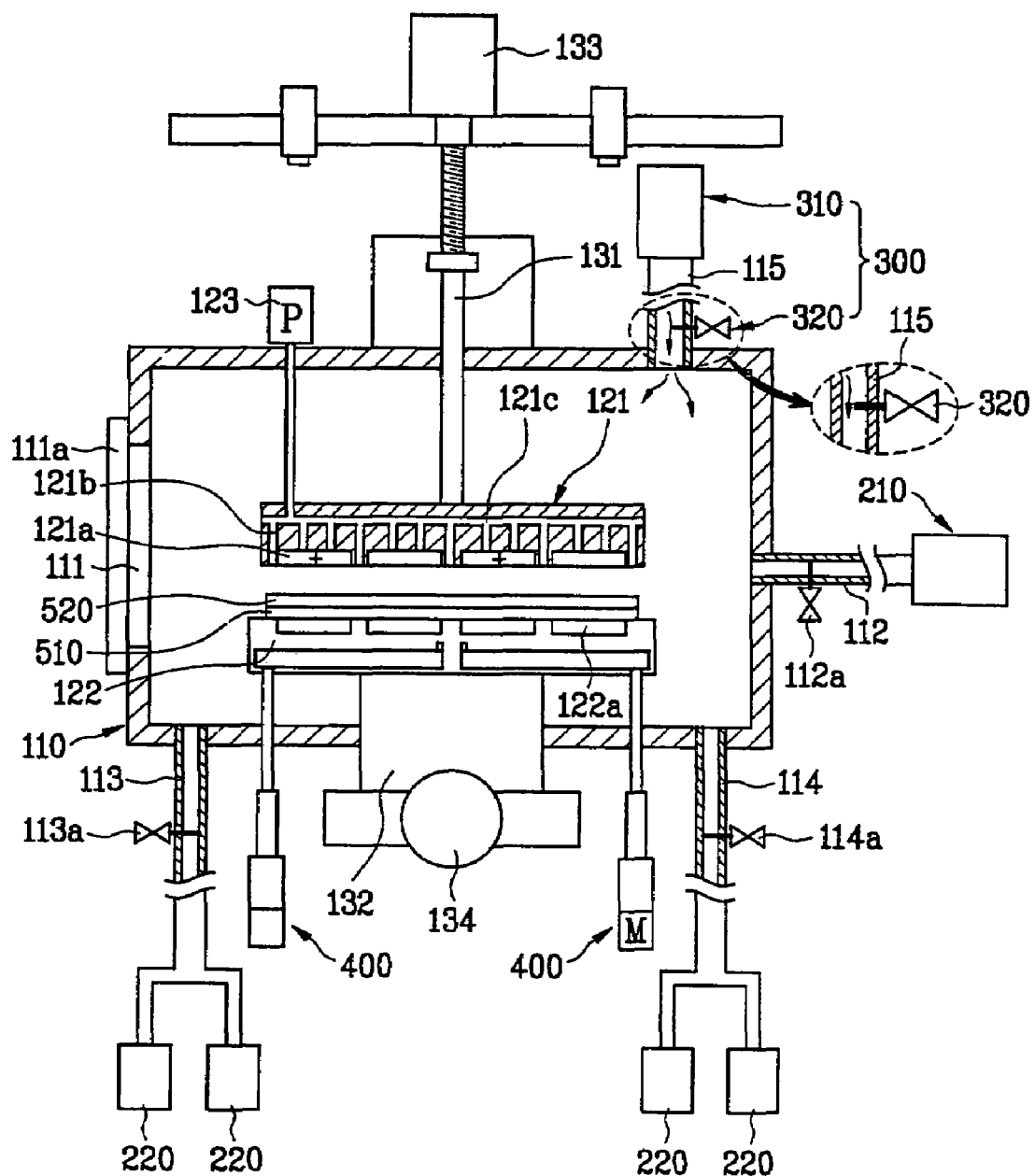
Figure 9A:
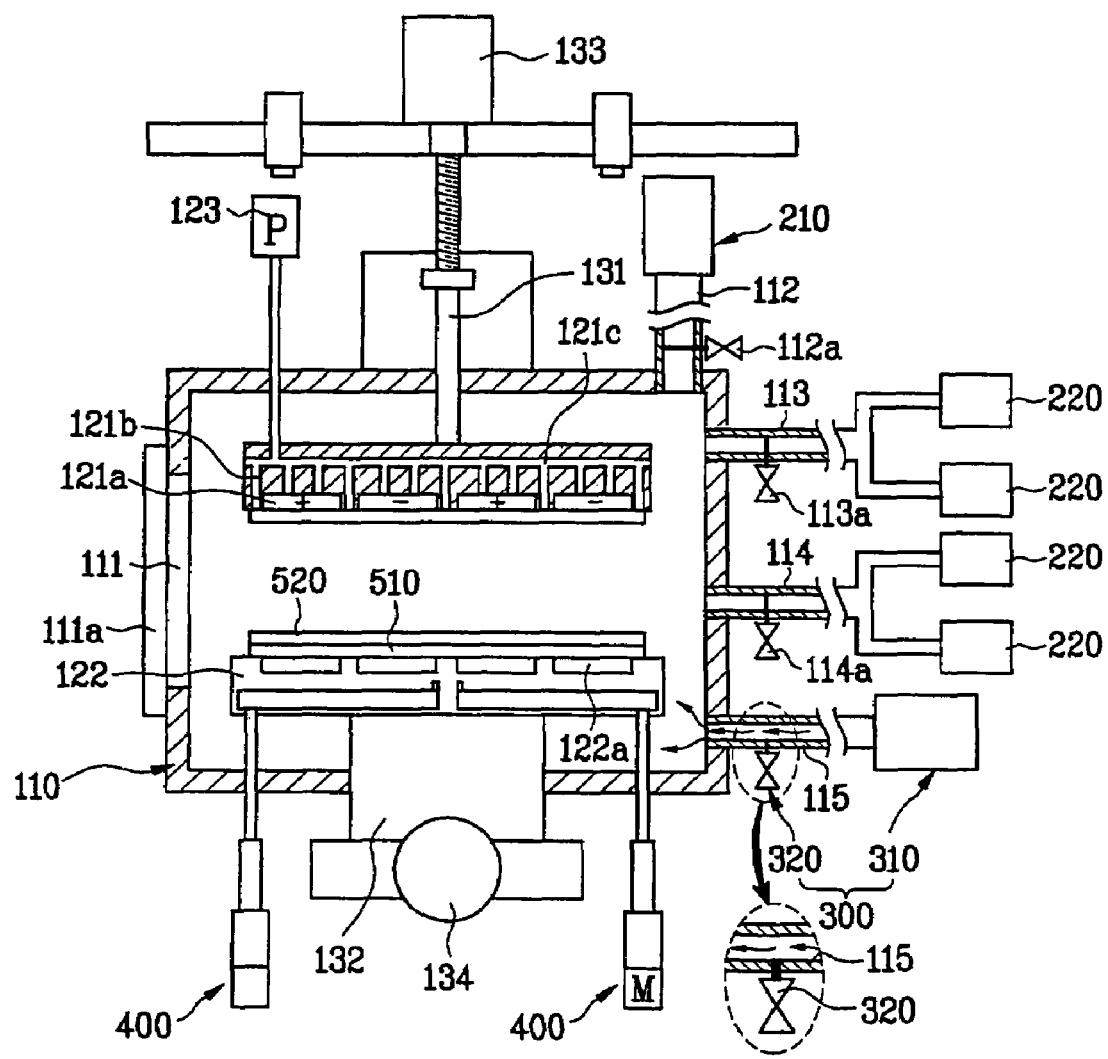
FIGS. 9A and 9B illustrate a state of operation of bonding machines according to the present invention, in which an interior of a bonding chamber is fully turned into an atmospheric pressure state.
Figure 9B:
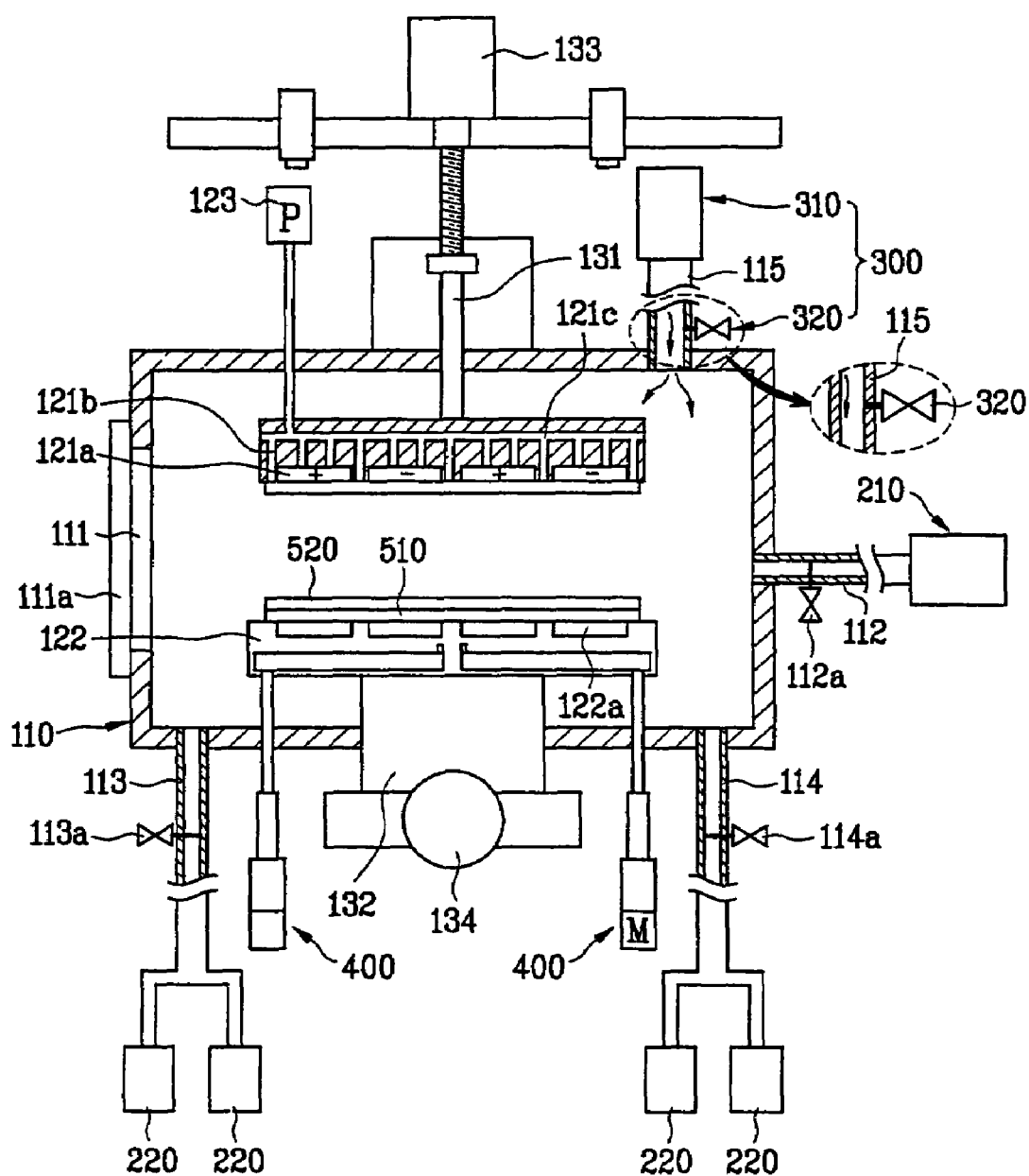

Next, referring to FIGS. 8A and 8B, the vent pipe 115 is opened to the required degree via the valve 320 at an initial stage. Then, referring to FIGS. 9A and 9B, the vent pipe 115 is opened fully in order to pressurize the bonding chamber 110 slowly. The pressure difference in the bonding chamber 110 during the slow pressurization of the bonding chamber causes a pressure to be applied to the two substrates. Since the chamber is at the atmospheric pressure and the space between the bonded substrates is at a vacuum, thus the two substrates are subjected to a uniform application of pressure.

Although only one vent 300 is shown, multiple vents, for example, may positioned at any location on the chamber. For example, referring to FIG. 8B, the vent may be positioned at the top of the chamber.

Then, the bonded substrates are unloaded (38S). That is, after the door 111a in the bonding chamber 110 is operated to open the bonding chamber entrance 111, the bonded first and second glass substrates 510 and 520 are unloaded by using the loader on the robot directly, or after the upper stage holds and moves up the first and second stages 121.

To shorten the fabrication time period, one of the first and second glass substrates to be bonded in the next bonding process may be loaded onto an empty stage while the fixed first and second glass substrates are unloaded. For example, after the second glass substrate 520 to be bonded in the next bonding process is brought to the upper stage 121 via the loader and held to the upper stage by vacuum, the bonded first and second glass substrates on the lower stage 122 may be unloaded. Alternatively, after the upper stage 121 lifts the bonded first and second glass substrates, the loader may load the first glass substrate 510 to be bonded on the lower stage and the bonded first and second glass substrates may be unloaded.

A liquid crystal spreading process may optionally be added before the process of unloading the bonded substrates in which the liquid crystal between the fixed substrates may be spread toward the sealant. Alternatively, a liquid crystal spreading process may be carried out to evenly spread the liquid crystal toward the sealant when the liquid crystal does not adequately spread after the unloading. The liquid crystal spreading process may be carried out for more than 10 minutes under atmospheric pressure or in a vacuum.

As has been explained the LCD bonding machines and the method for fabricating LCDs have the following advantages.

First, the LCD bonding machines of the present invention includes at least two different vacuum pumps, which have different vacuum powers. For example, a TMP and dry pumps that allow a smooth evacuation of the bonding chamber thereby preventing damage to the liquid crystal panel.

Second, the step by step evacuation of the bonding chamber permits operation of other parts required during the steps of evacuation are made at the same time, thereby improving efficiencies in the fabrication process.

Third, the availability of two staged evacuations from a low vacuum pressure to a high vacuum pressure without generating excessive air suction pressures prevents deformation caused by rapid evacuation and defective distribution of the liquid crystal in the substrates.

Fourth, the availability of gradual introduction of air or gas into the bonding chamber for sustaining the atmospheric pressure in the process of turning the bonding chamber into the atmospheric pressure prevents defective bonding of the substrates.

Fifth, the one-piece bonding chamber is favorable for obtaining a high vacuum in the bonding chamber. That is, it minimizes or eliminates leaks that may be present in the two-piece bonding chamber.

Sixth, the dispensing the liquid crystal on the first substrate and coating of the sealant on the second substrate reduces the fabrication time.

Seventh, dispensing liquid crystal onto the first substrate and coating sealant on the second substrate permits a balanced progression of the fabrication processes to the first and second substrates, thereby making effective use of the production line.

Eighth, not dropping liquid crystal on the second substrate permits the sealant minimizes contamination of particles on the second substrate because it can be cleaned by USC just prior to bonding.

Ninth, since the bonding chamber is evacuated after the substrate receiving means supports a central portion of the substrate prevents falling and breakage of the substrate even if the substrate is of large size.

Tenth, sensing the time during which the two substrates come into contact and varying the pressure in bonding the two substrates minimizes damage made by the liquid crystal to the orientation film.

Eleventh, since the upper stage presses the substrate down by means of a plurality of shafts, each of which is capable of applying pressure independently, uniform bonding of the sealant can be achieved by independently applying a lower or higher pressure by predetermined shafts when the lower stage and the upper stage are not level or fail to bond to the sealant uniformly.

Twelfth, simultaneous loading and unloading of the glass substrates shortens the fabrication time.

Thirteenth, inclusion of a liquid crystal spreading process shortens the LCD fabrication time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) bonding machine comprising:
   a one piece bonding chamber for carrying out bonding of first and second substrates, the first substrate having liquid crystal dispensed thereon and the second substrate having sealant coated thereon;
   an upper stage and a lower stage within the one piece bonding chamber, the upper stage holding the second substrate and the lower stage holding the first substrate
   a substrate receiver for receiving the second substrate which was held on the upper stage, the substrate receiver supporting a central part of the second substrate in the non-active region, rather than supporting only the corner parts of the second substrate;
   at least two air outlets for evacuating an interior of the bonding chamber; and
   at least two vacuum means for evacuating the bonding chamber,
   at least one vent hole in communication with the bonding chamber for introducing air or gas into an interior of the bonding chamber; and
   a gas supply means connected to the at least one vent hole for supplying air or gas into the interior of the bonding chamber,
   wherein the at least two vacuum means include a turbo molecular pump connected to an air outlet and at least two dry pumps, the turbo molecular pump generating a greater vacuum than the at least two dry pumps connected to an air outlet different from the turbo molecular pump.

2. The LCD bonding machine of claim 1, wherein the at least two dry pumps include four dry pumps.

3. The LCD bonding machine of claim 2, wherein the four dry pumps are paired into two sets and each of the pairs are connected to an air outlet.

4. The LCD bonding machine of claim 1, wherein the turbo molecular pump has an evacuation rate of approximately 0.1-5.0 kl/min.

5. The LCD bonding machine of claim 1, wherein the dry pumps have an evacuation rate of approximately 10-30 kl/min.

6. The LCD bonding machine of claim 1, wherein the gas supplying means includes:
   a gas charge part having gas stored therein for turning a vacuum state into an atmospheric pressure state; and
   a valve for selectively opening and shutting the vent hole.

7. The LCD bonding machine of claim 6, wherein the gas supplying means further includes a driving pump for pumping the gas stored in the gas charge part into the bonding chamber.

* * * * *